United States Patent
Yao et al.

(10) Patent No.: US 9,553,804 B2
(45) Date of Patent: Jan. 24, 2017

(54) METHOD, DEVICE, AND SYSTEM FOR SUPPORTING CONTENT SUBSCRIPTION IN CONTENT NETWORK

(71) Applicant: Huawei Technologies Co., Ltd., Shenzhen, Guangdong (CN)

(72) Inventors: Chunfeng Yao, Beijing (CN); Lingyuan Fan, Shenzhen (CN); Zhefeng Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 14/609,148

(22) Filed: Jan. 29, 2015

(65) Prior Publication Data
US 2015/0139166 A1 May 21, 2015

Related U.S. Application Data

(63) Continuation of application No. PCT/CN2013/079343, filed on Jul. 15, 2013.

(30) Foreign Application Priority Data

Jul. 31, 2012 (CN) .......................... 2012 1 0271291

(51) Int. Cl.
*H04L 12/54* (2013.01)
*H04L 12/741* (2013.01)
(Continued)

(52) U.S. Cl.
CPC ......... *H04L 45/74* (2013.01); *G06F 17/30867* (2013.01); *H04L 12/18* (2013.01);
(Continued)

(58) Field of Classification Search
CPC ........ H04L 45/74; H04L 45/306; H04L 67/00; H04L 67/141; H04L 12/18; H04L 12/66; H04L 12/1859; H04L 12/6418; G06F 17/30867; H04W 40/02
See application file for complete search history.

(56) References Cited

U.S. PATENT DOCUMENTS 6,226,677 B1 * 5/2001 Slemmer ................. H04M 3/00
709/227
7,142,567 B1 * 11/2006 Caracciolo ......... H04N 7/17309
348/E7.07
(Continued)

FOREIGN PATENT DOCUMENTS

CN 1868350 A1 12/2007
CN 101188625 A 5/2008
(Continued)

OTHER PUBLICATIONS

Kusunoki et al., "An Application of Content Management on Named Data Networking," IEICE Technical Report IN2011-183, pp. 275-280, The Institute of Electronics Information and Communication Engineers, Tokyo, Japan (Mar. 2012).
(Continued)

*Primary Examiner* — Kevin Mew
(74) *Attorney, Agent, or Firm* — Fish & Richardson P.C.

(57) ABSTRACT

A method is provided for content subscription in content network. A content requesting node in the content network receives a first interest packet comprising a content identifier through a first port from a first user device, creates a subscription entry comprising the content identifier and an identifier of the first port, sends the first interest packet to the content providing node, receives a second interest packet through a second port from a second user device; adds an identifier of the second port to the subscription entry, receives multiple data packets provided by the content providing node according to the first interest packet, and sends the multiple data packets through the first port and the (Continued)

second port respectively to the first user device and the second user device according to the subscription entry.

11 Claims, 12 Drawing Sheets

(51) Int. Cl.
*H04L 29/08* (2006.01)
*H04L 12/64* (2006.01)
*G06F 17/30* (2006.01)
*H04L 12/18* (2006.01)
*H04L 12/66* (2006.01)
*H04W 40/02* (2009.01)
*H04L 12/725* (2013.01)

(52) U.S. Cl.
CPC ...... *H04L 12/1859* (2013.01); *H04L 12/6418* (2013.01); *H04L 12/66* (2013.01); *H04L 67/00* (2013.01); *H04L 67/141* (2013.01); *H04W 40/02* (2013.01); *H04L 45/306* (2013.01)

(56) References Cited

U.S. PATENT DOCUMENTS

| 9,319,311 | B2* | 4/2016 | Wang | H04L 45/306 |
| 2002/0184649 | A1* | 12/2002 | Wilson | H04N 21/235 725/114 |
| 2003/0231629 | A1* | 12/2003 | Banerjee | H04L 12/1859 370/390 |
| 2005/0175008 | A1* | 8/2005 | Thompson | H04L 12/18 370/390 |
| 2007/0067794 | A1* | 3/2007 | Russell | H04W 24/00 725/25 |
| 2007/0153820 | A1* | 7/2007 | Gould | H04J 3/245 370/432 |
| 2008/0080408 | A1* | 4/2008 | Gao | H04W 76/002 370/312 |
| 2009/0080328 | A1* | 3/2009 | Hu | H04L 65/4084 370/230 |
| 2009/0207773 | A1* | 8/2009 | Feng | H04L 41/5022 370/312 |
| 2009/0287835 | A1 | 11/2009 | Jacobson | |
| 2010/0195655 | A1 | 8/2010 | Jacobson et al. | |
| 2011/0099263 | A1 | 4/2011 | Patil et al. | |
| 2011/0265174 | A1 | 10/2011 | Thornton et al. | |
| 2011/0271007 | A1* | 11/2011 | Wang | H04L 45/306 709/238 |
| 2012/0011567 | A1* | 1/2012 | Cronk | H04L 63/102 726/4 |
| 2012/0039334 | A1* | 2/2012 | Mehta | H04L 12/1886 370/390 |
| 2012/0136945 | A1 | 5/2012 | Lee et al. | |

FOREIGN PATENT DOCUMENTS

| CN | 101635895 A | 1/2010 |
| CN | 10211147 A | 6/2011 |
| CN | 102111447 A | 6/2011 |
| CN | 102523166 A | 6/2012 |
| EP | 1868350 A1 | 12/2007 |
| EP | 2339797 A1 | 6/2011 |
| JP | 2002290952 A | 10/2002 |
| JP | 2011135575 A | 7/2011 |
| JP | 2011244445 A | 12/2011 |

OTHER PUBLICATIONS

Yi et al. "Adaptive Forwarding in Named Data Networking," ACM SIGCOMM Computer Communication Review, vol. 42, Issue 3, pp. 62-67, Association for Computing Machinery, New York, New York (Jul. 2012).

Tsilopoulos et al., "Supporting Diverse Traffic Types in Information Centric Networks," Proceedings of the ACM SIGCOMM Workshop on Information-centric Networks, pp. 13-18, Association for Computing Machinery, New York, New York (Aug. 19, 2011).

Liu et al., "Content-centric Research for Internet Architecture," Research and Development, Beijing University of Posts and Telecommunications, China Unicom Research Institute, pp. 66-70, Beijing, China (Jun. 2011).

* cited by examiner

METHOD, DEVICE, AND SYSTEM FOR SUPPORTING CONTENT SUBSCRIPTION IN CONTENT NETWORK

CROSS-REFERENCE TO RELATED APPLICATION

This application is a continuation of International Patent Application No. PCT/CN2013/079343, filed on Jul. 15, 2013, which claims priority to Chinese Patent Application No. 201210271291.9, filed on Jul. 31, 2012, both of which are incorporated herein by reference in their entireties.

TECHNICAL FIELD

The present invention relates to the communications field, and in particular, to a method, a device, and a system for supporting content subscription in a content-centric network.

BACKGROUND

A change in a manner of generating, populating, obtaining, and using information and content is a most significant change which the Internet brings to people's life. Various Internet-based applications come out one after another, most of which are related to the "content". According to a statistics report of China Internet Network Information Center, online music, online news, search engine, instant messaging, online video, blog application, and social network are the most significant types of network applications at present. In fact, all these applications may be regarded as content sharing. As a result, content sharing becomes a more and more important function of the Internet. Although the "content" was not placed in a key position when the Internet came out, the "content" actually is playing a key role in the Internet. A main task of a conventional network is to transfer content from one place to another; however, information in a network is more likely used for sharing and cooperation at present. Therefore, a novel network architecture, that is, a content-centric network (Content Centric Network, CCN) is proposed. This network can run in parallel with the TCP (Transmission Control Protocol, Transmission Control Protocol)/IP (Internet Protocol, Internet Protocol) or run independently without affecting existing networks.

A content-centric network, for example, an NDN (Named Data Networking) network, primarily includes two types of packets, an interest packet (Interest Packet) and a data packet (Data Packet). An interest packet may be used to subscribe to a data packet. At present, one interest packet can be used to subscribe to only one data packet. As a result, when there are a large number of subscription requirements, a large number of interest packets need to be sent in a network, causing large network signaling overhead.

SUMMARY

Embodiments of the present invention provide a method, a device, and a system for supporting content subscription in a content network, which can reduce the number of interest packets in a content network, thereby reducing network signaling overhead.

In a first aspect, a method for supporting content subscription in a content network is provided, where the method is applicable to a content network node, the content network node communicates with a content providing device through one or more other forwarding nodes, and the method includes: receiving, by the content network node, a first interest packet from user equipment UE, where the first interest packet includes a first content identifier, and the first content identifier is used to indicate content to be subscribed to by the first interest packet; when a pending interest table PIT has no first subscription entry corresponding to the first content identifier, creating, by the content network node, the first subscription entry, where the first subscription entry includes the first content identifier and a first port number used in receiving the first interest packet, and the first content identifier corresponds to the first port number, so that a subscription request through a first port represented by the first port number and corresponding to the first content identifier is valid within a first valid duration; forwarding, by the content network node, the first interest packet to the other forwarding node, so that after receiving the first interest packet, the other forwarding node requests, within the first valid duration, multiple data packets corresponding to the content indicated by the first content identifier from the content providing device, and sends the multiple data packets obtained by requesting to the content network node; and receiving, by the content network node, the multiple data packets, and forwarding the received multiple data packets to the UE.

In a second aspect, a method for supporting content subscription in a content network is provided, where the method is applicable to a content network node, the content network node communicates with a content providing device through one or more other forwarding nodes, and the method includes: receiving, by the content network node, a first interest packet from user equipment UE, where the first interest packet includes a first content identifier, and the first content identifier is used to indicate content to be subscribed to by the first interest packet; when a pending interest table PIT has a first subscription entry corresponding to the first content identifier, adding, by the content network node, a first port number used in receiving the first interest packet to the first subscription entry, so that a subscription request through a first port represented by the first port number and corresponding to the first content identifier is valid within a first valid duration; receiving multiple data packets from the content providing device and corresponding to the content indicated by the first content identifier that are forwarded by the other forwarding node within the first valid duration; and forwarding, by the content network node, the received multiple data packets to the UE.

In a third aspect, a method for supporting content subscription in a content network is provided, where the method is applicable to a forwarding node in the content network, the forwarding node communicates with a content network node and a content providing device, and the method includes: receiving, by the forwarding node, a first interest packet forwarded by the content network node, where the first interest packet is received by the content network node from user equipment UE, the first interest packet includes a first content identifier, and the first content identifier is used to indicate content to be subscribed to by the first interest packet; when a pending interest table PIT has no second subscription entry corresponding to the first content identifier, creating, by the forwarding node, the second subscription entry, where the second subscription entry includes the first content identifier and a second port number used in receiving the first interest packet, and the first content identifier corresponds to the second port number, so that a subscription request from the UE through the second port represented by the second port number and corresponding to the first content identifier is valid within a first valid duration; requesting, by the forwarding node, multiple data packets corresponding to the content indicated by the first content identifier from the content providing device, and receiving the multiple data packets from the content providing device within the first valid duration; and forwarding, by the forwarding node, the multiple data packets to the content network node, so that the content network node forwards the multiple data packets to the UE after receiving the multiple data packets.

In a fourth aspect, a method for supporting content subscription in a content network is provided, where the method is applicable to a forwarding node in the content network, the forwarding node communicates with a content network node and a content providing device, and the method includes: receiving, by the forwarding node, a first interest packet forwarded by the content network node, where the first interest packet is received by the content network node from user equipment UE, the first interest packet includes a first content identifier, and the first content identifier is used to indicate content to be subscribed to by the first interest packet; when a pending interest table PIT has a second subscription entry corresponding to the first content identifier, adding, by the forwarding node, a second port number used in receiving the first interest packet to the second subscription entry, so that a subscription request through a second port represented by the second port number and corresponding to the first content identifier is valid within a first valid duration; receiving, by the forwarding node, multiple data packets corresponding to the content indicated by the first content identifier from the content providing device within the first valid duration; and forwarding, by the forwarding node, the multiple data packets to the content network node, so that the content network node forwards the multiple data packets to the UE after receiving the multiple data packets.

In a fifth aspect, a content network node is provided, where the content network node communicates with a content providing device through one or more other forwarding nodes, and the content network node includes: a receiving unit, configured to receive a first interest packet from user equipment UE, where the first interest packet includes a first content identifier, and the first content identifier is used to indicate content to be subscribed to by the first interest packet; a creating unit, configured to: when a pending interest table PIT has no first subscription entry corresponding to the first content identifier obtained from the receiving unit, create the first subscription entry, where the first subscription entry includes the first content identifier and a first port number used in receiving the first interest packet, and the first content identifier corresponds to the first port number, so that a subscription request through a first port represented by the first port number and corresponding to the first content identifier is valid within a first valid duration; and a sending unit, configured to receive the first interest packet from the receiving unit and forward the first interest packet to the other forwarding node, so that after receiving the first interest packet, the other forwarding node requests, within the first valid duration, multiple data packets corresponding to the content indicated by the first content identifier from the content providing device, and sends the multiple data packets obtained by requesting to the content network node, where the receiving unit is further configured to receive the multiple data packets; and the sending unit is further configured to receive the multiple data packets from the receiving unit, and forward the multiple data packets to the UE.

In a sixth aspect, a content network node is provided, where the content network node communicates with a content providing device through one or more other forwarding nodes, and the content network node includes: a receiving unit, configured to receive a first interest packet from user equipment UE, where the first interest packet includes a first content identifier, and the first content identifier is used to indicate content to be subscribed to by the first interest packet; an adding unit, configured to: when a pending interest table PIT has a first subscription entry corresponding to the first content identifier obtained from the receiving unit, add a first port number used in receiving the first interest packet to the first subscription entry, so that a subscription request through a first port represented by the first port number and corresponding to the first content identifier is valid within a first valid duration, where the receiving unit is further configured to receive multiple data packets from the content providing device and corresponding to the content indicated by the first content identifier that are forwarded by the other forwarding node within the first valid duration; and a sending unit, configured to receive the multiple data packets from the receiving unit, and forward the multiple data packets to the UE.

In a seventh aspect, a forwarding node is provided, where the forwarding node communicates with a content network node and a content providing device, and the forwarding node includes: a receiving unit, configured to receive a first interest packet forwarded by the content network node, where the first interest packet is received by the content network node from user equipment UE, the first interest packet includes a first content identifier, and the first content identifier is used to indicate content to be subscribed to by the first interest packet; a creating unit, configured to: when a pending interest table PIT has no second subscription entry corresponding to the first content identifier obtained from the receiving unit, create the second subscription entry, where the second subscription entry includes the first content identifier and a second port number used in receiving the first interest packet, and the first content identifier corresponds to the second port number, so that a subscription request through the second port represented by the second port number and corresponding to the first content identifier is valid within a first valid duration; a requesting unit, configured to request multiple data packets corresponding to the content indicated by the first content identifier from the content providing device within the first valid duration, where the receiving unit is further configured to receive the multiple data packets obtained by requesting by the requesting unit from the content providing device; and a sending unit, configured to obtain the multiple data packets from the receiving unit, and forward the multiple data packets to the content network node, so that the content network node forwards the multiple data packets to the UE after receiving the multiple data packets.

In an eighth aspect, a forwarding node is provided, where the forwarding node communicates with a content network node and a content providing device, and the forwarding node includes: a receiving unit, configured to receive a first interest packet forwarded by the content network node, where the first interest packet is received by the content network node from user equipment UE, the first interest packet includes a first content identifier, and the first content identifier is used to indicate content to be subscribed to by the first interest packet; an adding unit, configured to: when a pending interest table PIT has a second subscription entry corresponding to the first content identifier obtained from the receiving unit, add a second port number used in receiving the first interest packet to the second subscription entry, so that a subscription request through a second port represented by the second port number and corresponding to the first content identifier is valid within a first valid duration, where the receiving unit is further configured to receive multiple data packets corresponding to the content indicated by the first content identifier from the content providing device within the first valid duration; and a sending unit, configured to obtain the multiple data packets from the receiving unit, and forward the multiple data packets to the content network node, so that the content network node forwards the multiple data packets to the UE after receiving the multiple data packets.

In a ninth aspect, a system for supporting content subscription in a content network is provided, including a content network node and one or more other forwarding nodes, where the content network node communicates with a content providing device through the one or more other forwarding nodes; the content network node is configured to receive a first interest packet from user equipment UE, where the first interest packet includes a first content identifier, and the first content identifier is used to indicate content to be subscribed to by the first interest packet; the content network node is further configured to: when a pending interest table PIT has no first subscription entry corresponding to the first content identifier, create the first subscription entry, where the first subscription entry includes the first content identifier and a first port number used in receiving the first interest packet, and the first content identifier corresponds to the first port number, so that a subscription request through a first port represented by the first port number and corresponding to the first content identifier is valid within a first valid duration; the content network node is further configured to forward the first interest packet to the other forwarding node; the other forwarding node is configured to request multiple data packets corresponding to the content indicated by the first content identifier from the content providing device within the first valid duration after receiving the first interest packet, and send the multiple data packets obtained by requesting to the content network node; and the content network node is further configured to forward the received multiple data packets to the UE.

In a tenth aspect, a system for supporting content subscription in a content network is provided, including a content network node and one or more other forwarding nodes, where the content network node communicates with a content providing device through the one or more other forwarding nodes; the content network node is configured to receive a first interest packet from user equipment UE, where the first interest packet includes a first content identifier, and the first content identifier is used to indicate content to be subscribed to by the first interest packet; the content network node is further configured to: when a pending interest table PIT has a first subscription entry corresponding to the first content identifier obtained from the UE, add a first port number used in receiving the first interest packet to the first subscription entry, so that a subscription request through a first port represented by the first port number and corresponding to the first content identifier is valid within a first valid duration; the other forwarding node is configured to forward multiple data packets from the content providing device and corresponding to the content indicated by the first content identifier to the content network node within the first valid duration; the content network node is further configured to receive the multiple data packets from the other forwarding node; and the content network node is further configured to forward the received multiple data packets to the UE.

In an eleventh aspect, a system for supporting content subscription in a content network is provided, including a content network node and one or more forwarding nodes, where the forwarding node communicates with the content network node and a content providing device; the content network node is configured to receive a first interest packet from user equipment UE, and forward the first interest packet to the forwarding node, where the first interest packet includes a first content identifier, and the first content identifier is used to indicate content to be subscribed to by the first interest packet; the forwarding node is configured to: when a pending interest table PIT has no second subscription entry corresponding to the first content identifier obtained from the content network node, create the second subscription entry, where the second subscription entry includes the first content identifier and a second port number used in receiving the first interest packet, and the first content identifier corresponds to the second port number, so that a subscription request through the second port represented by the second port number and corresponding to the first content identifier is valid within a first valid duration; the forwarding node is configured to request multiple data packets corresponding to the content indicated by the first content identifier from the content providing device within the first valid duration; the forwarding node is further configured to receive the multiple data packets obtained by requesting from the content providing device; the forwarding node is further configured to forward the multiple data packets to the content network node; and the content network node is further configured to forward the multiple data packets to the UE after receiving the multiple data packets from the forwarding node.

In a twelfth aspect, a system for supporting content subscription in a content network is provided, including a content network node and one or more forwarding nodes, where the forwarding node communicates with the content network node and a content providing device; the content network node is configured to receive a first interest packet from user equipment UE, and forward the first interest packet to the forwarding node, where the first interest packet includes a first content identifier, and the first content identifier is used to indicate content to be subscribed to by the first interest packet; the forwarding node is configured to: when a pending interest table PIT has a second subscription entry corresponding to the first content identifier obtained from the content network node, add a second port number used in receiving the first interest packet to the second subscription entry, so that a subscription request through a second port and corresponding to the first content identifier is valid within a first valid duration; the forwarding node is further configured to receive multiple data packets corresponding to the content indicated by the first content identifier from the content providing device within the first valid duration; the forwarding node is further configured to forward the multiple data packets to the content network node; and the content network node is further configured to forward the multiple data packets to the UE after receiving the multiple data packets from the forwarding node.

In the embodiments of the present invention, the first subscription entry is created in the PIT, so that the subscription request through the first port represented by the first port number and corresponding to the first content identifier is valid within the first valid duration, and the first interest packet is forwarded to the other forwarding node, so that the multiple data packets requested from the content providing device and corresponding to the content to be subscribed to can be received from the other forwarding node within the first valid duration, and the corresponding data packets can be returned to the UE. Therefore, within the first valid duration, the UE does not need to send the first interest packet repeatedly to subscribe to the same content, which can reduce the number of interest packets in the content network, thereby reducing network signaling overhead.

BRIEF DESCRIPTION OF DRAWINGS

To illustrate the technical solutions in the embodiments of the present invention more clearly, the following briefly introduces the accompanying drawings required for describing the embodiments of the present invention.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention.

In the embodiments of the present invention, user equipment (User Equipment, UE), which may also be referred to as a mobile terminal (Mobile Terminal, MT), mobile user equipment, and the like, may communicate with one or more core networks through a wireless access network (for example, RAN, Radio Access Network). The user equipment may be a mobile terminal, such as a mobile phone, (which may also be referred to as a "cellular" phone), a computer having a mobile terminal, for example, a portable, pocket-sized, handheld, computer built-in, or vehicle-mounted mobile apparatus.

Figure 1:
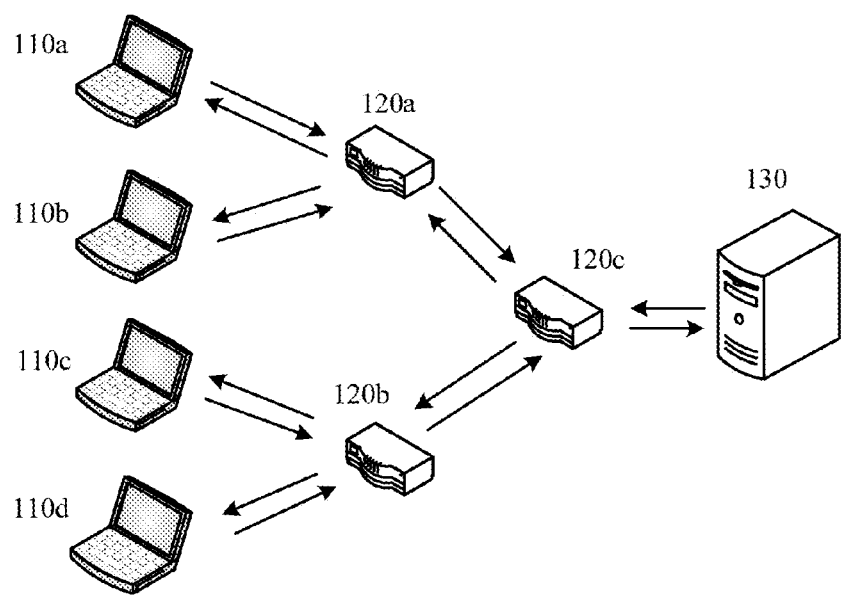
FIG. 1 is a schematic diagram of an example of a scenario to which an embodiment of the present invention is applicable.

FIG. 1 is a schematic diagram of an example of a scenario to which an embodiment of the present invention is applicable.

For example, the scenario shown in FIG. 1 may be a content network, such as an NDN network or a content network of another type, which is not limited in the embodiment of the present invention.

As shown in FIG. 1, it is assumed that there are four UE, which respectively are UE 110a, UE 110b, UE 110c, and UE 110d; three network nodes, which respectively are node 120a, node 120b, and node 120c; and one server 130.

UE 110a and UE 110b can communicate with node 120a. For example, UE 110a and UE 110b can send an interest packet to node 120a or receive a data packet from node 120a. UE 110c and UE 110d can communicate with node 120b. Node 120a and node 120b can communicate with node 120c, that is, node 120c is a next-hop node for node 120a and node 120b. For example, node 120a and node 120b may send an interest packet to node 120c and may receive a data packet from node 120c. Node 120c can communicate with server 130. For example, node 120c can send an interest packet to server 130 and receive a data packet from server 130.

It should be noted that the example in FIG. 1 is merely used to help a person skilled in the art to have a better understanding of the embodiments of the present invention, and is not intended to limit the scope of the embodiments of the present invention. For example, although FIG. 1 shows that two UE can communicate with one node, in the embodiments of the present invention, more or less UE may communicate with one node, or one UE may communicate with more nodes, which is not limited in the embodiments of the present invention. Moreover, in the embodiments of the present invention, there may be more or less UE, nodes, and servers, which is not limited in the embodiments of the present invention.

Figure 2:
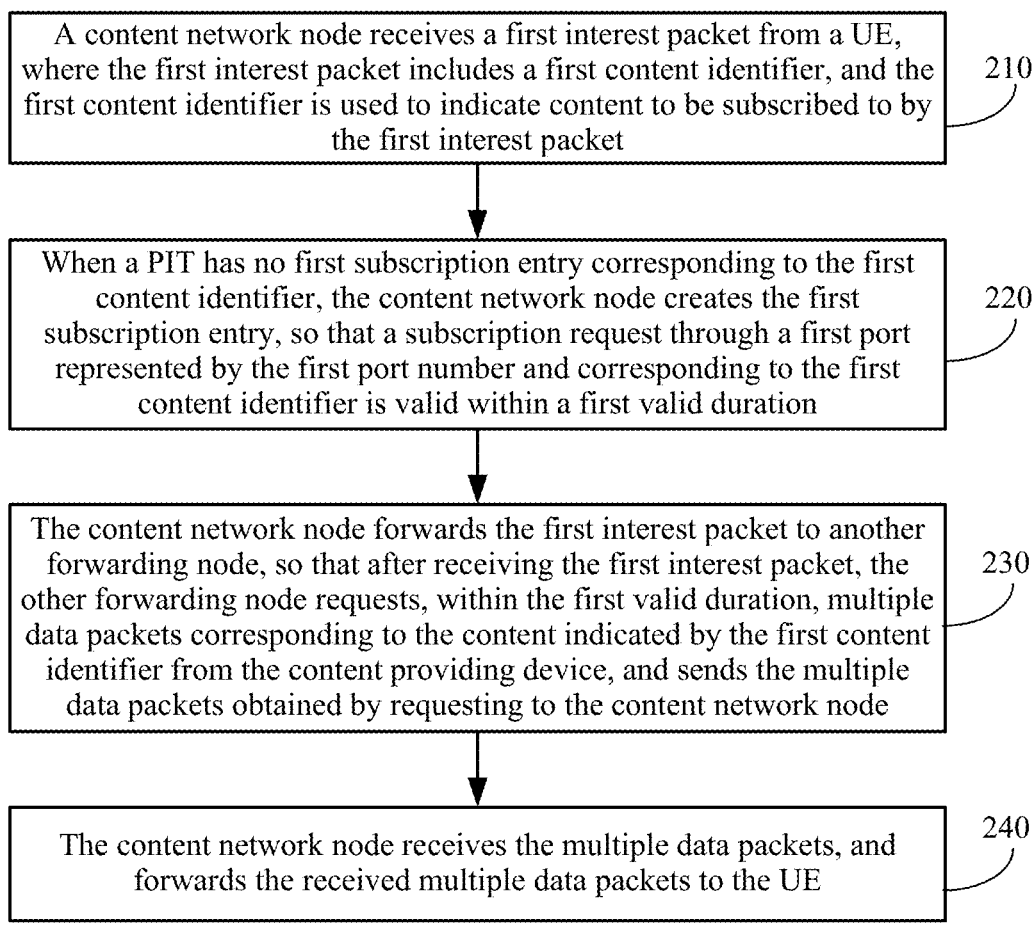
FIG. 2 is a schematic flowchart of a method for supporting content subscription in a content network according to an embodiment of the present invention.

FIG. 2 is a schematic flowchart of a method for supporting content subscription in a content network according to an embodiment of the present invention. The method in FIG. 2 is applicable to a content network node, where the content network node may communicate with a content providing device through one or more other forwarding nodes. In other words, the method in FIG. 2 may be executed by a content network node, such as node 120a or node 120b in FIG. 1.

210. A content network node receives a first interest packet from UE, where the first interest packet includes a first content identifier, and the first content identifier is used to indicate content to be subscribed to by the first interest packet.

For example, in the scenario shown in FIG. 1, node 120a may receive a first interest packet from UE 110a and/or UE 110b.

In the embodiment of the present invention, the content to be subscribed to by the first interest packet may refer to a service, for example, a movie or a channel. One service may include multiple data packets. Therefore, in the embodiment of the present invention, the first interest packet may subscribe to multiple data packets while one interest packet can subscribe only to one data packet in the prior art, which reduces the number of first interest packets in a content network. Therefore, in the embodiment of the present invention, the first interest packet may also be referred to as a long term interest packet (long term interest).

220. When a pending interest table (Pending Interest Table, PIT) has no first subscription entry corresponding to the first content identifier, the content network node creates the first subscription entry, where the first subscription entry includes the first content identifier and a first port number used in receiving the first interest packet, and the first content identifier corresponds to the first port number, so that a subscription request through a first port represented by the first port number and corresponding to the first content identifier is valid within a first valid duration.

Specifically, the PIT may be stored in the content network node. The PIT may include multiple subscription entries. The subscription entry may include subscription information related to a content identifier. For example, the first subscription entry may include the first content identifier and the first port number. In addition, the first subscription entry may further include other related information, which is not limited in the embodiment of the present invention.

230. The content network node forwards the first interest packet to the other forwarding node, so that after receiving the first interest packet, the other forwarding node requests, within the first valid duration, multiple data packets corresponding to the content indicated by the first content identifier from the content providing device, and sends the multiple data packets obtained by requesting to the content network node.

240. The content network node receives the multiple data packets, and forwards the received multiple data packets to the UE.

The content providing device is a device that can provide the content to be subscribed to by the first interest packet, which may be a content network node in the content network or a server in the content network. For example, in the scenario shown in FIG. 1, the content providing device may be node 120a, node 120b, node 120c, or server 130.

There may be one or more other forwarding nodes between the content network node and the content providing device. For example, in the scenario shown in FIG. 1, assuming that the content providing device is server 130 and the method is executed by node 120a, there is one forwarding node 120c between node 120a and server 130.

It should be noted that the example is merely used to help a person skilled in the art to have a better understanding of the embodiment of the present invention, and is not intended to limit the scope of the embodiment of the present invention.

Specifically, because the PIT has no first subscription entry in step 220, which may indicate that no other UE subscribed to the content indicated by the first content identifier from the content network node, the content network node may send the first interest packet to the other forwarding node, so as to subscribe to the content from the other forwarding node by using the first interest packet.

For example, the content network node may search a forwarding information base (Forwarding Information Base, FIB) stored locally for forwarding port information matching the first interest packet, and forward the first interest packet to the other forwarding node according to the forwarding port information. In addition, if no forwarding port information matching the first interest packet is found in the FIB, the content network node may also forward the first interest packet to the other forwarding node according to default forwarding port information, or discard the first interest packet.

The other forwarding node may request and receive, within the first valid duration, the multiple data packets corresponding to the content indicated by the first content identifier from the content providing device, and then return the multiple data packets to the content network node. Because the first port number is a port number used by the content network node to receive the first interest packet, the first port number may represent a communication path between the content network node and the UE. In this way, the content network node may forward the multiple data packets to the UE according to the first port number.

Because the first subscription entry is created in the PIT, so that the subscription request through the first port represented by the first port number and corresponding to the first content identifier is valid within the first valid duration; and the first interest packet is used to subscribe to the content from the other forwarding node, so that the multiple data packets corresponding to the content to be subscribed to and requested by the other forwarding node from the content providing device can be received within the first valid duration (where a request may be initiated at intervals), the corresponding data packets can be returned to the UE (that is, the received data packets are sent to the UE after being received). Therefore, within the first valid duration, the UE does not need to send the first interest packet repeatedly to subscribe to the same content, which can reduce the number of interest packets in the content network. In addition, because the first interest packet can be used to subscribe to multiple data packets, pipeline (pipeline) processing in the prior art is unnecessary; meanwhile, because the number of interest packets can be reduced, overhead of the PIT can be reduced.

In the embodiment of the present invention, the first subscription entry is created in the PIT, so that the subscription request through the first port represented by the first port number and corresponding to the first content identifier is valid within the first valid duration, and the first interest packet is forwarded to the other forwarding node, so that the multiple data packets requested from the content providing device and corresponding to the content to be subscribed to can be received from the other forwarding node within the first valid duration, and the corresponding data packets can be returned to the UE. Therefore, within the first valid duration, the UE does not need to send the first interest packet repeatedly to subscribe to the same content, which can reduce the number of interest packets in the content network, reduce network signaling overhead, and improve forwarding efficiency (that is, multiple data packets can be received within a duration after one first interest packet is sent).

Optionally, as an embodiment, when the PIT has the first subscription entry, the content network node may add the first port number to the first subscription entry, so that the subscription request through the first port and corresponding to the first content identifier is valid within the first valid duration; and when there is one or more other forwarding nodes between the content network node and the content providing device, receive the multiple data packets from the content providing device and corresponding to the content indicated by the first content identifier that are forwarded by the other forwarding node within the first valid duration, and forward the multiple data packets to the UE.

Specifically, if the PIT has the first subscription entry, which may indicate that the other UE subscribed to the same content from the content network node, the content network node may add the first port number to the first subscription entry. In this way, when the other forwarding node returns the multiple data packets corresponding to the content to be subscribed to, the content network node may forward the multiple data packets to the UE according to the first port number.

Optionally, as another embodiment, after the content network node forwards the first interest packet to the other forwarding node, the other forwarding node creates a second subscription entry after receiving the first interest packet, where the second subscription entry may include the first content identifier. The content network node may send a second interest packet to the other forwarding node, where the second interest packet may include the first content identifier, so that the other forwarding node updates the first valid duration to a second valid duration after receiving the second interest packet, and a subscription request through a second port represented by a second port number and corresponding to the first content identifier is valid within the second valid duration, where the second port number is a port number used by the other forwarding node to receive the second interest packet. The content network node may receive the multiple data packets from the content providing device and corresponding to the content indicated by the first content identifier that are forwarded by the other forwarding node within the second valid duration, and forward the multiple data packets to the UE.

Specifically, a frame structure of the second interest packet may be the same as or different from a frame structure of the first interest packet, which is not limited in the embodiment of the present invention.

After receiving the first interest packet, the other forwarding node may create a second subscription entry in a PIT stored locally, and record the first content identifier in the second subscription entry, so as to record the subscription request and enable the subscription request to be valid within the first valid duration. The other forwarding node may keep returning corresponding data packets to the content network node within the first valid duration.

In order to maintain the subscription request from the UE, the content network node may send a second interest packet to the other forwarding node within the first valid duration. For example, the content network node may send the second interest packet periodically within the first valid duration, where the sending interval may be ½, ⅓, or ¼ of the first valid duration. This allows a packet loss to a certain extent, thereby improving stability and reliability of the system. In addition, the content network node may also send the second interest packet aperiodically within the first valid duration, which is not limited in the embodiment of the present invention. In the embodiment of the present invention, the second interest packet may also be referred to as a keep alive interest packet (keep alive interest).

After receiving the second interest packet, the other forwarding node may update the first valid duration to a second valid duration, so that the subscription request is valid within the second valid duration, so as to maintain the subscription request.

The second valid duration may be the same as or different from the first valid duration, which is not limited in the embodiment of the present invention.

In this way, after the first valid duration is updated to the second valid duration, the other forwarding node may keep requesting, within the second valid duration, multiple data packets corresponding to the content to be subscribed to from the content providing device, and then return the multiple data packets to the content network node according to the second port number. The content network node may return the multiple data packets to the UE according to the first port number.

Optionally, as another embodiment, after forwarding the multiple data packets to the UE, the content network node may keep the first port number in the first subscription entry undeleted, and retain the first port number within the first valid duration.

Specifically, the content network node may keep the first port number in the first subscription entry undeleted after forwarding to the UE the data packets corresponding to the content to be subscribed to, so as to keep the subscription request to be valid within the first valid duration.

Optionally, as another embodiment, after the other forwarding node forwards the multiple data packets from the content providing device and corresponding to the content indicated by the first content identifier within the second valid duration, the other forwarding node keeps the second port number in the second subscription entry undeleted, and retains the second port number within the second valid duration.

Specifically, after forwarding the multiple data packets from the content providing device and corresponding to the content indicated by the first content identifier within the second valid duration, the other forwarding node keeps the second port number in the second subscription entry undeleted, so as to keep the subscription request to be valid within the second valid duration.

Optionally, as another embodiment, the content network node may determine whether the multiple data packets corresponding to the content indicated by the first content identifier are stored locally. When a determining result is yes, the content network node may return the multiple data packets corresponding to the content indicated by the first content identifier to the UE. When a determining result is no, the content network node forwards the first interest packet to the other forwarding node.

If the multiple data packets corresponding to the content indicated by the first content identifier are stored, the multiple data packets may be forwarded to the UE. If the multiple data packets corresponding to the content indicated by the first content identifier are not stored, the first interest packet may be forwarded to the other forwarding node.

For example, the UE may instruct the content network node whether to query the local memory. For example, in a case where content to be subscribed to is a non-real-time service, the UE may instruct the content network node to query the local memory. Alternatively, the content network node may determine whether it is necessary to query the local memory according to whether content to be subscribed to is a non-real-time service. For example, in a case where content to be subscribed to is a non-real-time service, it may be determined that the local memory needs to be queried.

If multiple data packets corresponding to the content to be subscribed to are stored, the content network node may return all the data packets to the UE in sequence. For example, the content network node may query a content store (Content Store, CS) table to determine whether the multiple data packets corresponding to the content to be subscribed to are stored. For example, assuming that the content to be subscribed to is a movie, if all data packets of the movie are stored in the CS table, the content network node may return all the data packets of the movie to the UE in sequence. However, in the prior art, each data packet of the movie needs to be subscribed to by using one interest packet, which cannot implement the subscription to the movie as a whole. In other words, in the prior art, multiple interest packets are required to subscribe to one service. Therefore, in the embodiment of the present invention, the number of interest packets in the content network can be reduced.

If the multiple data packets corresponding to the content to be subscribed to are not stored, for example, the content network node finds no corresponding data packet in the CS table, the content network node may send the first interest packet to the other forwarding node, so as to subscribe to the data packets from the other forwarding node.

Optionally, as another embodiment, the content network node may forward the first interest packet to the other forwarding node without querying the local memory.

For example, the UE may instruct the content network node whether to query the local memory. For example, in a case where content to be subscribed to is a real-time service, the UE may instruct the content network node not to query the local memory. Alternatively, the content network node may determine whether it is necessary to query the local memory according to whether content to be subscribed to is a real-time service. For example, in a case where content to be subscribed to is a real-time service, it may be determined that the local memory does not need to be queried. In other words, latest data packets are required for a real-time service. Therefore, the first interest packet may be directly sent to the other forwarding node, so as to obtain the latest data packets from the content providing device.

In addition, the content network node may also be a content providing device, and in such cases, the local memory may be queried.

Optionally, as another embodiment, the first interest packet may further include a first valid duration identifier, where the first valid duration identifier may be used to indicate the first valid duration. The content network node may enable, according to the first valid duration identifier, the subscription request through the first port represented by the first port number and corresponding to the first content identifier to be valid within the first valid duration indicated by the first valid duration identifier.

Specifically, the UE may notify the content network node of a valid duration of a subscription request thereof by using the first interest packet. In addition, the first valid duration may also be set in advance by the content network node, which is not limited in the embodiment of the present invention.

Optionally, as another embodiment, the second interest packet may further include a second valid duration identifier, where the second valid duration identifier may be used to indicate the second valid duration. The other forwarding node may enable, according to the second valid duration identifier, the subscription request from the UE through the second port represented by the second port number and corresponding to the second interest packet to be valid within the second valid duration indicated by the second valid duration identifier.

Specifically, the content network node may notify, by using the second interest packet, the other forwarding node of the second valid duration within which a previous subscription request corresponding to the first content identifier needs to be maintained.

Optionally, as another embodiment, the content network node may receive a third interest packet from the UE, where the third interest packet includes the first content identifier, and then invalidate the subscription request through the first port represented by the first port number and corresponding to the first content identifier according to the third interest packet.

Specifically, when the UE no longer needs to subscribe to the content, the UE may notify, by using the third interest packet, the content network node of unsubscription from the content. In the embodiment of the present invention, the third interest packet may also be referred to as an unsubscribe interest packet (unsubscribe interest).

Optionally, as another embodiment, the content network node may invalidate the subscription request through the first port represented by the first port number and corresponding to the first content identifier when the first valid duration expires.

Specifically, if the first valid duration expires, which may indicate that the UE no longer needs to subscribe to the content, the content network node may invalidate the subscription request through the first port represented by the first port number and corresponding to the first content identifier, so as to stop forwarding subsequent corresponding data packets to the UE. This may unsubscribe from the content, thereby using the bandwidth efficiently.

Optionally, as another embodiment, the content network node may delete the first port number from the first subscription entry.

Specifically, the content network node may delete the first port number, so as to stop forwarding subsequent corresponding data packets to the UE. This may quickly unsubscribe from the content, thereby using the bandwidth efficiently.

Optionally, as another embodiment, the content network node may delete the first subscription entry from the PIT when all port numbers in the first subscription entry are deleted.

Specifically, if all port numbers in the first subscription entry are deleted, which may indicate that no UE subscribes to the content, the content network node may delete the first subscription entry.

Optionally, as another embodiment, the content network node sends the third interest packet to the other forwarding node after the first port number is deleted from the first subscription entry and in a case where no other port number corresponds to the first content identifier, so that the other forwarding node invalidates the subscription request through the second port represented by the second port number and corresponding to the first content identifier after receiving the third interest packet.

Specifically, if no UE needs to subscribe to the content, the content network node may notify, by using the third interest packet, the other forwarding node of unsubscription from the content, so as to stop subsequent corresponding data packets from being returned to the content network node.

Optionally, as another embodiment, the other forwarding node may delete the second port number from the second subscription entry after receiving the third interest packet.

Specifically, because the content network node notifies the other forwarding node by using the third interest packet that the content no longer needs to be subscribed to, the other forwarding node may delete the second port number, so as to stop forwarding subsequent corresponding data packets to the content network node. This may quickly unsubscribe from the content, thereby using the bandwidth efficiently.

Optionally, as another embodiment, the other forwarding node may delete the second port number from the second subscription entry when the second valid duration expires.

Specifically, when the second valid duration expires, which may indicate that the content network node no longer needs to subscribe to the content, the other forwarding node may delete the second port number, so as to stop forwarding subsequent corresponding data packets to the content network node. This may unsubscribe from the content, thereby using the bandwidth efficiently.

In the embodiment of the present invention, the first subscription entry is created in the PIT, so that the subscription request through the first port represented by the first port number and corresponding to the first content identifier is valid within the first valid duration, and the first interest packet is forwarded to the other forwarding node, so that the multiple data packets requested from the content providing device and corresponding to the content to be subscribed to can be received from the other forwarding node within the first valid duration, and the corresponding data packets can be returned to the UE. Therefore, within the first valid duration, the UE does not need to send the first interest packet repeatedly to subscribe to the same content, which can reduce the number of interest packets in the content network.

Figure 3:
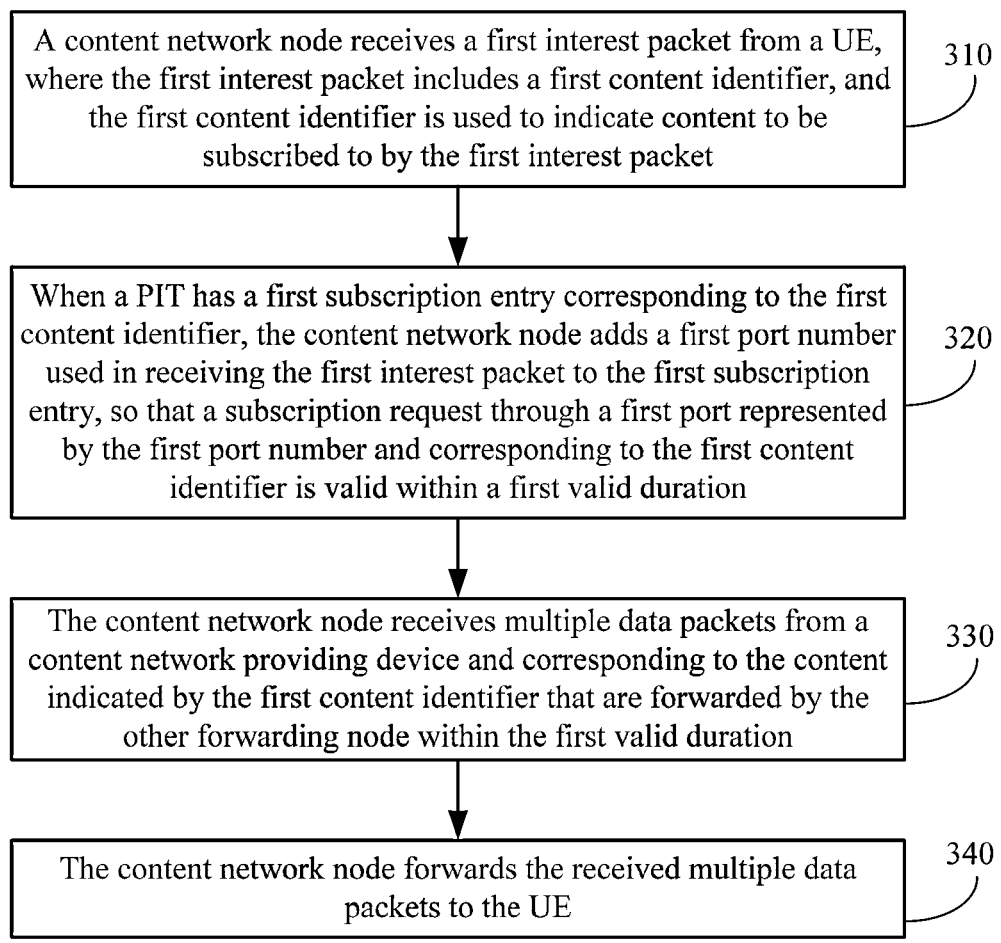
FIG. 3 is a schematic flowchart of a method for supporting content subscription in a content network according to another embodiment of the present invention.

FIG. 3 is a schematic flowchart of a method for supporting content subscription in a content network according to another embodiment of the present invention. The method in FIG. 3 is applicable to a content network node, where the content network node may communicate with a content providing device through one or more other forwarding nodes. In other words, the method in FIG. 3 may be executed by a content network node, such as node 120a or node 120b in FIG. 1.

310. A content network node receives a first interest packet from UE, where the first interest packet includes a first content identifier, and the first content identifier is used to indicate content to be subscribed to by the first interest packet.

For example, in the scenario shown in FIG. 1, node 120a may receive a first interest packet from UE 110a and/or UE 110b.

In the embodiments of the present invention, the content to be subscribed to by the first interest packet may refer to a service, for example, a movie or a channel One service may include multiple data packets. Therefore, in the embodiment of the present invention, the first interest packet may subscribe to multiple data packets. However, in the prior art, one interest packet can subscribe only to one data packet. Therefore, the number of first interest packets in the content network can be reduced.

320. When a PIT has a first subscription entry corresponding to the first content identifier, the content network node adds a first port number used in receiving the first interest packet to the first subscription entry, so that a subscription request through a first port represented by the first port number and corresponding to the first content identifier is valid within a first valid duration.

Specifically, the PIT may be stored in the content network node. The PIT may include multiple subscription entries. The subscription entry may include subscription information related to a content identifier. For example, the first subscription entry may include the first content identifier and the first port number. In addition, the first subscription entry may further include other related information, which is not limited in the embodiment of the present invention.

330. The content network node receives multiple data packets from the content providing device and corresponding to the content indicated by the first content identifier that are forwarded by the other forwarding node within the first valid duration.

340. The content network node forwards the received multiple data packets to the UE.

The content providing device is a device that can provide the content to be subscribed to by the first interest packet, which may be a content network node in the content network or a server in the content network. For example, in the scenario shown in FIG. 1, the content providing device may be node 120a, node 120b, node 120c, or server 130.

There may be one or more other forwarding nodes between the content network node and the content providing device. For example, in the scenario shown in FIG. 1, assuming that the content providing device is server 130 and the method is executed by node 120a, there is one forwarding node 120c between node 120a and server 130.

It should be noted that the example is merely used to help a person skilled in the art to have a better understanding of the embodiment of the present invention, and is not intended to limit the scope of the embodiment of the present invention.

If the PIT has the first subscription entry, which may indicate that the current other UE subscribed to the same content from the content network node, the content network node may add the first port number to the first subscription entry. Because the first port number is a port number used by the content network node to receive the first interest packet, the first port number may represent a communication path between the content network node and the UE. In this way, when the other forwarding node returns the multiple data packets corresponding to the content to be subscribed to, the content network node may forward the multiple data packets to the UE according to the first port number.

Because the PIT has the first subscription entry, the first port number is added to the first subscription entry, so that the subscription request through the first port represented by the first port number and corresponding to the first content identifier is valid within the first valid duration, and the multiple data packets corresponding to the content to be subscribed to that are required by the other forwarding node from the content providing device are received, so that the corresponding data packets can be returned to the UE. Therefore, within the first valid duration, the UE does not need to send the first interest packet repeatedly to subscribe to the same content, which can reduce the number of interest packets in the content network. In addition, because the first interest packet can be used to subscribe to multiple data packets, pipeline processing in the prior art is unnecessary; meanwhile, because the number of interest packets can be reduced, overhead of the PIT can be reduced.

In the embodiment of the present invention, the first port number is added to the first subscription entry of the PIT, so that the subscription request through the first port represented by the first port number and corresponding to the first content identifier is valid within the first valid duration, and the multiple data packets corresponding to the content to be subscribed to that are required by the other forwarding node from the content providing device are received, so that the corresponding data packets can be returned to the UE. Therefore, within the first valid duration, the UE does not need to send the first interest packet repeatedly to subscribe to the same content, which can reduce the number of interest packets in the content network.

Optionally, as an embodiment, the content network node may send a second interest packet to the other forwarding node, where the second interest packet includes the first content identifier, so that the other forwarding node updates the first valid duration to a second valid duration after the second interest packet is received and when a PIT of the other forwarding node has a second subscription entry, where the second subscription entry includes the first content identifier and the first valid duration, and a subscription request through the second port represented by the second port number and corresponding to the first content identifier is valid within the second valid duration, where the second port number is a port number used by the other forwarding node to receive the second interest packet; and may receive the multiple data packets from the content providing device and corresponding to the content indicated by the first content identifier that are forwarded by the other forwarding node within the second valid duration, and forward the multiple data packets to the UE.

Specifically, a frame structure of the second interest packet may be the same as or different from a frame structure of the first interest packet, which is not limited in the embodiment of the present invention.

Because the PIT has the first subscription entry, it may indicate that the content network node subscribed to the content from the other forwarding node by using the first interest packet. The other forwarding node created the second subscription entry in the PIT stored locally, and recorded the first content identifier and the first valid duration in the second subscription entry, so that the subscription request is recorded and the subscription request is valid within the first valid duration.

Therefore, in order to maintain the subscription request from the UE, the content network node may send the second interest packet to the other forwarding node within the first valid duration. For example, the content network node may send the second interest packet periodically within the first valid duration, where the sending interval may be ½, ⅓, or ¼ of the first valid duration. This allows a packet loss to a certain extent, thereby improving stability and reliability of the system. In addition, the content network node may also send the second interest packet aperiodically within the first valid duration, which is not limited in the embodiment of the present invention.

After receiving the second interest packet, the other forwarding node may update the first valid duration to a second valid duration, so that the subscription request is valid within the second valid duration, so as to maintain the subscription request.

The second valid duration may be the same as or different from the first valid duration, which is not limited in the embodiment of the present invention.

In this way, after the first valid duration is updated to the second valid duration, the other forwarding node may keep requesting, within the second valid duration, multiple data packets corresponding to the content to be subscribed to from the content providing device, and then return the multiple data packets to the content network node according to the second port number. The content network node may return the multiple data packets to the UE according to the first port number.

Optionally, as another embodiment, after forwarding the multiple data packets to the UE, the content network node may keep the first port number in the first subscription entry undeleted, and retain the first port number within the first valid duration.

Specifically, the content network node may keep the first port number in the first subscription entry undeleted after forwarding to the UE the data packets corresponding to the content to be subscribed to, so as to keep the subscription request to be valid within the first valid duration.

Optionally, as another embodiment, after the other forwarding node forwards the multiple data packets from the content providing device and corresponding to the content indicated by the first content identifier within the second valid duration, the other forwarding node may keep the second port number in the second subscription entry undeleted, and retain the second port number within the second valid duration.

Specifically, after forwarding the multiple data packets from the content providing device and corresponding to the content indicated by the first content identifier within the second valid duration, the other forwarding node keeps the second port number in the second subscription entry undeleted, so as to keep the subscription request to be valid within the second valid duration.

Optionally, as another embodiment, the content network node may determine whether the multiple data packets corresponding to the content indicated by the first content identifier are stored locally. When a determining result is yes, the content network node may return the multiple data packets corresponding to the content indicated by the first content identifier to the UE. When a determining result is no, the content network node receives the multiple data packets from the content providing device and corresponding to the content indicated by the first content identifier that are forwarded by the other forwarding node within the first valid duration.

For example, the UE may instruct the content network node whether to query a local memory. For example, in a case where content to be subscribed to is a non-real-time service, the UE may instruct the content network node to query the local memory. Alternatively, the content network node may determine whether it is necessary to query the local memory according to whether content to be subscribed to is a non-real-time service. For example, in a case where content to be subscribed to is a non-real-time service, it may be determined that the local memory needs to be queried.

If the multiple data packets corresponding to the content to be subscribed to are stored, the content network node may return all the data packets to the UE in sequence. For example, the content network node may query a content store (Content Store, CS) table to determine whether the multiple data packets corresponding to the content to be subscribed to are stored. For example, assuming that the content to be subscribed to is a movie, if all data packets of the movie are stored in the CS table, the content network node may return all the data packets of the movie to the UE in sequence. However, in the prior art, each data packet of the movie needs to be subscribed to by using one interest packet, which cannot implement the subscription to the movie as a whole. In other words, in the prior art, multiple interest packets are required to subscribe to one service.

Therefore, in the embodiment of the present invention, the number of interest packets in the content network can be reduced.

If the multiple data packets corresponding to the content to be subscribed to are not stored, for example, the content network node finds no corresponding data packet in the CS table, the content network node may receive the corresponding data packets from the other forwarding node, and forward the data packets to the UE.

Optionally, as another embodiment, the first interest packet further includes a first valid duration identifier, where the first valid duration identifier may be used to indicate the first valid duration. The content network node may enable, according to the first valid duration identifier, the subscription request through the first port represented by the first port number and corresponding to the first content identifier to be valid within the first valid duration indicated by the first valid duration identifier.

Specifically, the UE may notify the content network node of a valid duration of a subscription request thereof by using the first interest packet. In addition, the first valid duration may also be set in advance by the content network node, which is not limited in the embodiment of the present invention.

Optionally, as another embodiment, the second interest packet may further include a second valid duration identifier, where the second valid duration identifier may be used to indicate the second valid duration. The content network node may enable, according to the second valid duration identifier, the subscription request through the second port represented by the second port number and corresponding to the first content identifier to be valid within the second valid duration indicated by the second valid duration identifier.

Specifically, the content network node may notify, by using the second interest packet, the other forwarding node of the second valid duration within which a previous subscription request corresponding to the first content identifier needs to be maintained.

Optionally, as another embodiment, the content network node may receive a third interest packet from the UE, where the third interest packet includes the first content identifier, and then invalidate the subscription request through the first port represented by the first port number and corresponding to the first content identifier according to the third interest packet.

Specifically, when the UE no longer needs to subscribe to the content, the UE may notify, by using the third interest packet, the content network node of unsubscription from the content.

Optionally, as another embodiment, the content network node may invalidate the subscription request through the first port represented by the first port number and corresponding to the first content identifier when the first valid duration expires.

Specifically, if the first valid duration expires, which may indicate that the UE no longer needs to subscribe to the content, the content network node may invalidate the subscription request through the first port represented by the first port number and corresponding to the first content identifier, so as to stop forwarding subsequent corresponding data packets to the UE. This may unsubscribe from the content, thereby using the bandwidth efficiently.

Optionally, as another embodiment, the content network node may delete the first port number from the first subscription entry.

Specifically, the content network node may delete the first port number, so as to stop forwarding subsequent corresponding data packets to the UE. This may quickly unsubscribe from the content, thereby using the bandwidth efficiently.

Optionally, as another embodiment, the content network node may delete the first subscription entry from the PIT when all port numbers in the first subscription entry are deleted.

Specifically, if all port numbers in the first subscription entry are deleted, which may indicate that no UE subscribes to the content, the first subscription entry may be deleted.

Optionally, as another embodiment, the content network node may send the third interest packet to the other forwarding node after the first port number is deleted from the first subscription entry and in a case where no other port number corresponds to the first content identifier, so that the other forwarding node invalidates the subscription request through the second port represented by the second port number and corresponding to the first content identifier after receiving the third interest packet.

Specifically, after the first port number is deleted from the first subscription entry and in a case where no port number corresponds to the first content identifier, which indicates that the content indicated by the first content identifier does not need to be subscribed to, the content network node may notify, by using the third interest packet, the other forwarding node of unsubscription from the content, so as to stop subsequent corresponding data packets from being returned to the content network node.

Optionally, as another embodiment, the other forwarding node may delete the second port number from the second subscription entry after receiving the third interest packet.

Specifically, because the content network node notifies the other forwarding node by using the third interest packet that the content no longer needs to be subscribed to, the other forwarding node may delete the second port number, so as to stop forwarding subsequent corresponding data packets to the content network node. This may quickly unsubscribe from the content, thereby using the bandwidth efficiently.

Optionally, as another embodiment, the other forwarding node may delete the second port number from the second subscription entry when the second valid duration expires.

Specifically, when the second valid duration expires, which may indicate that the content network node no longer needs to subscribe to the content, the other forwarding node may delete the second port number, so as to stop forwarding subsequent corresponding data packets to the content network node. This may unsubscribe from the content, thereby using the bandwidth efficiently.

In the embodiment of the present invention, the first port number is added to the first subscription entry of the PIT, so that the subscription request through the first port represented by the first port number and corresponding to the first content identifier is valid within the first valid duration, and the multiple data packets corresponding to the content to be subscribed to that are required by the other forwarding node from the content providing device are received, so that the corresponding data packets can be returned to the UE. Therefore, within the first valid duration, the UE does not need to send the first interest packet repeatedly to subscribe to the same content, which can reduce the number of interest packets in the content network, reduce network signaling overhead, and improve forwarding efficiency (that is, multiple data packets can be received within a duration after one first interest packet is sent).

Figure 4:
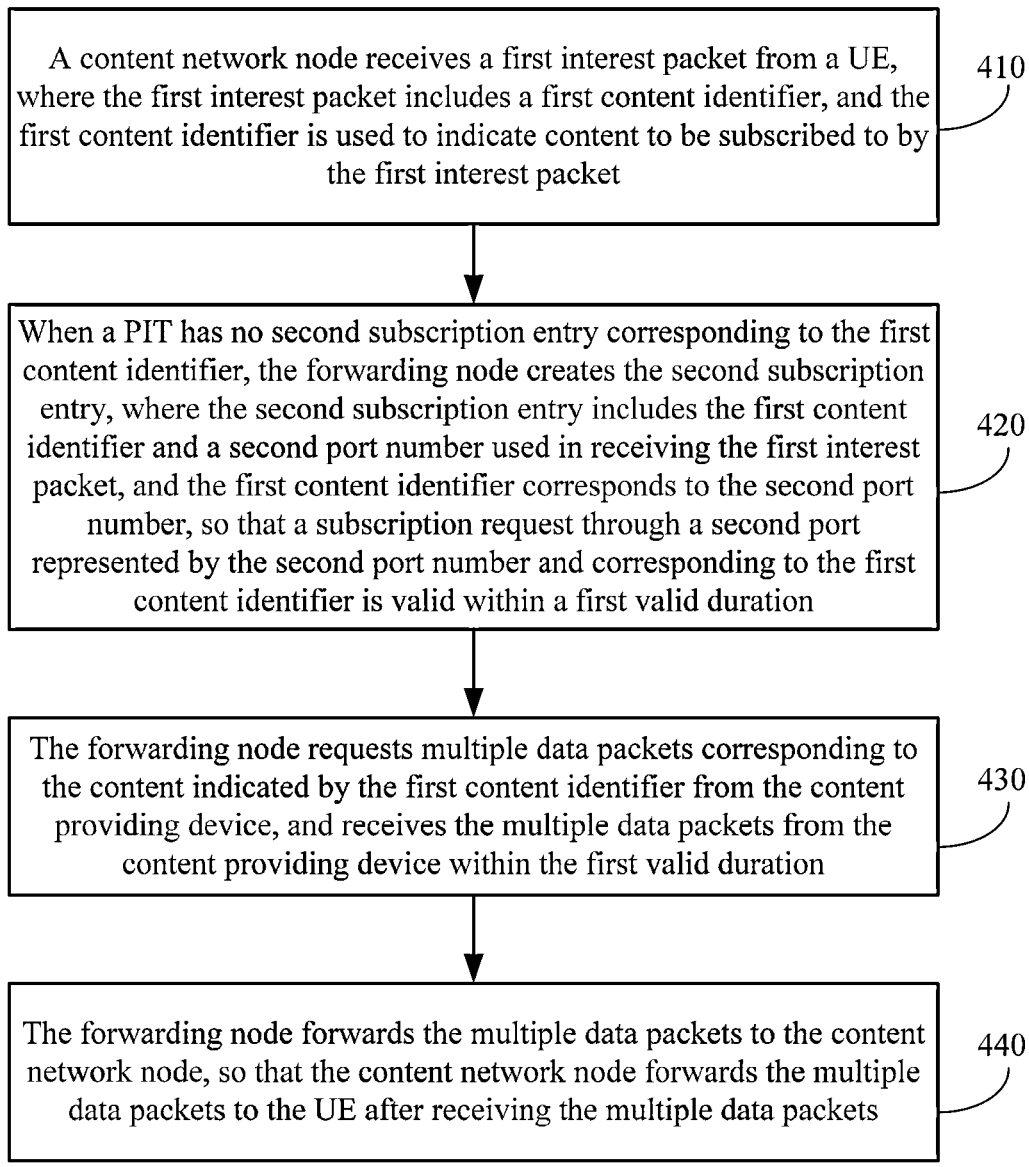
FIG. 4 is a schematic flowchart of a method for supporting content subscription in a content network according to another embodiment of the present invention.

FIG. 4 is a schematic flowchart of a method for supporting content subscription in a content network according to another embodiment of the present invention. The method in FIG. 4 is applicable to a forwarding node in a content network, where the forwarding node may communicate with a content network node and a content providing device. In other words, the method in FIG. 4 may be executed by the forwarding node, such as node 120c in FIG. 1.

410. A forwarding node receives a first interest packet forwarded by a content network node, where the first interest packet is received by the content network node from a UE, the first interest packet includes a first content identifier, and the first content identifier is used to indicate content to be subscribed to by the first interest packet.

For example, in the scenario shown in FIG. 1, node 120a may receive a first interest packet from UE 110a and/or UE 110b, and node 120c may receive the first interest packet forwarded by node 120a.

In the embodiment of the present invention, the content to be subscribed to by the first interest packet may refer to a service, for example, a movie or a channel. One service may include multiple data packets. Therefore, in the embodiment of the present invention, the first interest packet may subscribe to multiple data packets. However, in the prior art, one interest packet can subscribe only to one data packet. Therefore, the number of first interest packets in the content network can be reduced. Therefore, in the embodiment of the present invention, the first interest packet may also be referred to as a long term interest packet.

420. When a PIT has no second subscription entry corresponding to the first content identifier, the forwarding node creates the second subscription entry, where the second subscription entry includes the first content identifier and a second port number used in receiving the first interest packet, and the first content identifier corresponds to the second port number, so that a subscription request through a second port represented by the second port number and corresponding to the first content identifier is valid within a first valid duration.

Specifically, the PIT may be stored in the forwarding node. The PIT may include multiple subscription entries. The subscription entry may include subscription information related to a content identifier. For example, the second subscription entry may include the first content identifier and the second port number. In addition, the second subscription entry may further include other related information, which is not limited in the embodiment of the present invention.

430. The forwarding node requests multiple data packets corresponding to the content indicated by the first content identifier from the content providing device, and receives the multiple data packets from the content providing device within the first valid duration.

The content providing device is a device that can provide the content to be subscribed to by the first interest packet, which may be a content network node in the content network or a server in the content network. For example, in the scenario shown in FIG. 1, the content providing device may be server 130.

440. The forwarding node forwards the multiple data packets to the content network node, so that the content network node forwards the multiple data packets to the UE after receiving the multiple data packets.

Specifically, because the PIT has no second subscription entry in step 420, which may indicate that no content network node subscribed to the content indicated by the first content identifier from the forwarding node, the forwarding node may request the multiple data packets corresponding to the content from the content providing device.

Because the second port number may represent a port number used by the forwarding node to receive the first interest packet, the second port number may represent a communication path between the forwarding node and the content network node, and the forwarding node may return the multiple data packets to the content network device according to the second port number after receiving the multiple data packets returned by the content providing device.

Because the second subscription entry is created in the PIT, so that the subscription request through the second port represented by the second port number and corresponding to the first content identifier is valid within the first valid duration; and the multiple data packets corresponding to the content to be subscribed to are requested from the content providing device within the first valid duration (where a request may be initiated at intervals), so that the forwarding node may return the data packets received from the content providing device to the content network node within the first valid duration, the content network node can return the data packets received from the forwarding node to the UE. Therefore, within the first valid duration, the content network node does not need to send the first interest packet repeatedly to subscribe to the same content, which can reduce the number of interest packets in the content network. In addition, because the first interest packet can be used to subscribe to multiple data packets, pipeline processing in the prior art is unnecessary; meanwhile, because the number of interest packets can be reduced, overhead of the PIT can be reduced.

In the embodiment of the present invention, the second subscription entry is created in the PIT, so that the subscription request through the second port represented by the second port number and corresponding to the first content identifier is valid within the first valid duration; and the multiple data packets corresponding to the content to be subscribed to are requested from the content providing device within the first valid duration (where a request may be initiated at intervals), so that the forwarding node may return the data packets received from the content providing device to the content network node within the first valid duration. Therefore, within the first valid duration, the content network node does not need to send the first interest packet repeatedly to subscribe to the same content, which can reduce the number of interest packets in the content network, reduce network signaling overhead, and improve forwarding efficiency (that is, multiple data packets can be received within a duration after one first interest packet is sent).

Optionally, as an embodiment, when the PIT has the second subscription entry, the forwarding node may add the second port number to the second subscription entry, so that the subscription request through the second port and corresponding to the first content identifier is valid within the first valid duration. The forwarding node receives the multiple data packets corresponding to the content indicated by the first content identifier from the content providing device within the first valid duration. Then, the forwarding node forwards the multiple data packets obtained by requesting to the content network node, so that the content network node forwards the multiple data packets to the UE after receiving the multiple data packets.

Specifically, if the PIT has the second subscription entry, which may indicate that the current content network node subscribed to the same content from the forwarding node, the forwarding node may add the second port number to the second subscription entry. In this way, when the content providing device returns the multiple data packets corresponding to the content to be subscribed to, the forwarding node may forward the multiple data packets to the content network node according to the second port number.

Optionally, as another embodiment, the forwarding node may receive a second interest packet from the content network node, where the second interest packet includes the first content identifier. The forwarding node may update the first valid duration to a second valid duration according to the second interest packet, and enable a subscription request through the second port represented by the second port number and corresponding to the first content identifier to be valid within the second valid duration. The forwarding node may request the multiple data packets corresponding to the content indicated by the first content identifier from the content providing device, and receive the multiple data packets from the content providing device within the second valid duration. Then, the forwarding node may forward the multiple data packets obtained by requesting to the content network node within the second valid duration, so that the content network node forwards the multiple data packets to the UE after receiving the multiple data packets.

Specifically, a frame structure of the second interest packet may be the same as or different from a frame structure of the first interest packet, which is not limited in the embodiment of the present invention.

In order to maintain the subscription request from the UE, the content network node may send the second interest packet to the forwarding node within the first valid duration. For example, the content network node may send the second interest packet periodically within the first valid duration, where the sending interval may be ½, ⅓, or ¼ of the first valid duration. This allows a packet loss to a certain extent, thereby improving stability and reliability of the system. In addition, the content network node may also send the second interest packet aperiodically within the first valid duration, which is not limited in the embodiment of the present invention. In the embodiment of the present invention, the second interest packet may also be referred to as a keep alive interest packet.

After receiving the second interest packet, the forwarding node may update the first valid duration to a second valid duration, so that the subscription request is valid within the second valid duration, so as to maintain the subscription request.

The second valid duration may be the same as or different from the first valid duration, which is not limited in the embodiment of the present invention.

In this way, after the first valid duration is updated to the second valid duration, the forwarding node may keep requesting, within the second valid duration, multiple data packets corresponding to the content to be subscribed to from the content providing device, and then return the multiple data packets to the content network node according to the second port number. The content network node may return the multiple data packets to the UE according to the first port number.

Optionally, as another embodiment, after the forwarding node forwards the multiple data packets obtained by requesting to the content network node within the first valid duration, the forwarding node may keep the second port number in the second subscription entry undeleted, and retain the second port number within the first valid duration.

Specifically, after forwarding the multiple data packets to the content network node within the first valid duration, the forwarding node keeps the second port number in the second subscription entry undeleted, so as to keep the subscription request to be valid within the first valid duration.

Optionally, as another embodiment, after the forwarding node forwards the multiple data packets obtained by requesting to the content network node within the second valid duration, the forwarding node may keep the second port number in the second subscription entry undeleted, and retain the second port number within the second valid duration.

Specifically, after forwarding the multiple data packets to the content network node within the second valid duration, the forwarding node keeps the second port number in the second subscription entry undeleted, so as to keep the subscription request to be valid within the second valid duration.

Optionally, as another embodiment, the forwarding node may determine whether the multiple data packets corresponding to the content indicated by the first content identifier are stored locally. When a determining result is yes, the forwarding node may forward the multiple data packets to the content network node, so that the content network node forwards the multiple data packets to the UE after receiving the multiple data packets. When a determining result is no, the forwarding node may request the multiple data packets corresponding to the content indicated by the first content identifier from the content providing device within the first valid duration.

For example, the content network node may instruct the forwarding node whether to query the local memory. For example, in a case where content to be subscribed to is a non-real-time service, the content network node may instruct the forwarding node to query the local memory. Alternatively, the forwarding node may determine whether it is necessary to query the local memory according to whether content to be subscribed to is a non-real-time service. For example, in a case where content to be subscribed to is a non-real-time service, it may be determined that the local memory needs to be queried.

If the multiple data packets corresponding to the content to be subscribed to are stored, the forwarding node may return all the data packets to the content network node in sequence. For example, the forwarding node may query a CS table to determine whether the multiple data packets corresponding to the content to be subscribed to are stored. For example, assuming that the content to be subscribed to is a movie, if all data packets of the movie are stored in the CS table, the forwarding node may return all the data packets of the movie to the content network node in sequence. However, in the prior art, each data packet of the movie needs to be subscribed to by using one interest packet, which cannot implement the subscription to the movie as a whole. In other words, in the prior art, multiple interest packets are required to subscribe to one service. Therefore, in the embodiment of the present invention, the number of interest packets in the content network can be reduced.

If the multiple data packets corresponding to the content to be subscribed to are not stored, for example, the forwarding node finds no corresponding data packet in the CS table, the forwarding node may request the corresponding data packets from the content providing device.

Optionally, as another embodiment, the forwarding node may request the multiple data packets corresponding to the content indicated by the first content identifier from the content providing device within the first valid duration without querying the local memory.

For example, the content network node may instruct the forwarding node whether to query the local memory. For example, in a case where content to be subscribed to is a real-time service, the content network node may instruct the forwarding node not to query the local memory. Alternatively, the forwarding node may determine whether it is necessary to query the local memory according to whether content to be subscribed to is a real-time service. For example, in a case where content to be subscribed to is a real-time service, it may be determined that the local memory does not need to be queried. In other words, latest data packets are required for a real-time service. Therefore, the latest data packets may be directly requested from the content providing device.

Optionally, as another embodiment, the first interest packet may further include a first valid duration identifier, where the first valid duration identifier is used to indicate the first valid duration. The forwarding node may enable, according to the first valid duration identifier, the subscription request through the second port represented by the second port number and corresponding to the first content identifier to be valid within the first valid duration indicated by the first valid duration identifier.

Specifically, the content network node may notify the forwarding node of a valid duration of a subscription request from the UE by using the first interest packet. In addition, the first valid duration may also be set in advance by the forwarding node, which is not limited in the embodiment of the present invention.

Optionally, as another embodiment, the second interest packet may further include a second valid duration identifier, where the second valid duration identifier is used to indicate the second valid duration. The forwarding node may enable, according to the second valid duration identifier, the subscription request through the second port represented by the second port number and corresponding to the first content identifier to be valid within the second valid duration indicated by the second valid duration identifier.

Specifically, the content network node may notify, by using the second interest packet, the forwarding node of the second valid duration within which a previous subscription request corresponding to the first content identifier needs to be maintained.

Optionally, as another embodiment, the forwarding node may receive a third interest packet from the content network node, where the third interest packet includes the first content identifier. The forwarding node may invalidate the subscription request through the second port represented by the second port number and corresponding to the first content identifier according to the third interest packet.

Specifically, if no UE corresponding to the content network node needs to subscribe to the content, the content network node may notify, by using the third interest packet, the forwarding node of unsubscription from the content.

Optionally, as another embodiment, the forwarding node may invalidate the subscription request through the second port represented by the second port number and corresponding to the first content identifier when the first valid duration expires.

Specifically, if the first valid duration expires, which may indicate that the content network node no longer needs the data packets corresponding to the content, the forwarding node may invalidate the subscription request through the second port represented by the second port number and corresponding to the first content identifier, so as to stop forwarding subsequent corresponding data packets to the content network node. This may unsubscribe from the content, thereby using the bandwidth efficiently.

Optionally, as another embodiment, the forwarding node may delete the second port number from the second subscription entry.

Specifically, the forwarding node may delete the second port number, so as to stop forwarding subsequent corresponding data packets to the content network node. This may quickly unsubscribe from the content, thereby using the bandwidth efficiently.

Optionally, as another embodiment, the forwarding node may delete the second subscription entry from the PIT when all port numbers in the second subscription entry are deleted.

In the embodiment of the present invention, the second subscription entry is created in the PIT, so that the subscription request through the second port represented by the second port number and corresponding to the first content identifier is valid within the first valid duration; and the multiple data packets corresponding to the content to be subscribed to are requested from the content providing device within the first valid duration (where a request may be initiated at intervals), so that the forwarding node may return the data packets received from the content providing device to the content network node within the first valid duration. Therefore, within the first valid duration, the content network node does not need to send the first interest packet repeatedly to subscribe to the same content, which can reduce the number of interest packets in the content network, reduce network signaling overhead, and improve forwarding efficiency (that is, multiple data packets can be received within a duration after one first interest packet is sent).

Figure 5:
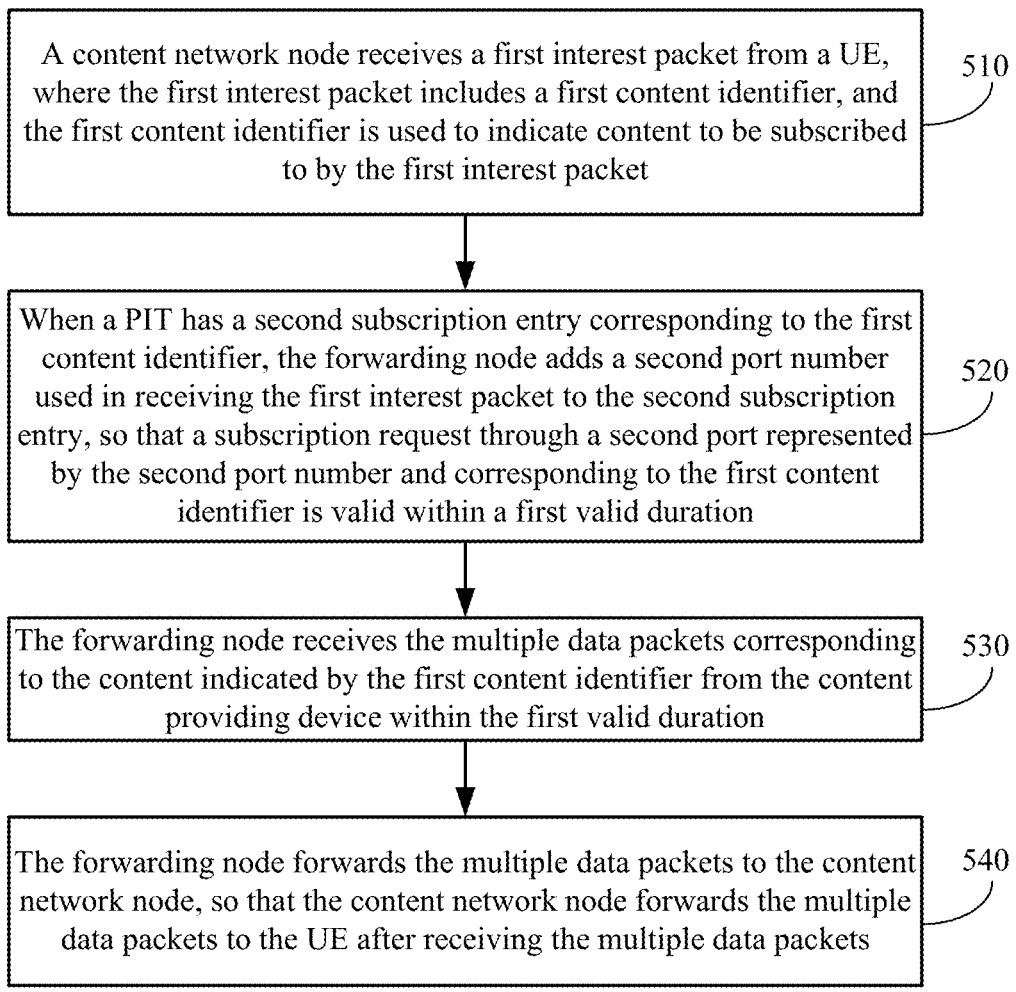
FIG. 5 is a schematic flowchart of a method for supporting content subscription in a content network according to another embodiment of the present invention.

FIG. 5 is a schematic flowchart of a method for supporting content subscription in a content network according to another embodiment of the present invention. The method in FIG. 5 is applicable to a forwarding node in a content network, where the forwarding node may communicate with a content network node and a content providing device. In other words, the method in FIG. 5 may be executed by the forwarding node, such as node 120c in FIG. 1.

510. A forwarding node receives a first interest packet forwarded by a content network node, where the first interest packet is received by the content network node from UE, the first interest packet includes a first content identifier, and the first content identifier is used to indicate content to be subscribed to by the first interest packet.

For example, in the scenario shown in FIG. 1, node 120a may receive a first interest packet from UE 110a and/or UE 110b, and node 120c may receive the first interest packet forwarded by node 120a.

In the embodiment of the present invention, the content to be subscribed to by the first interest packet may refer to a service, for example, a movie or a channel One service may include multiple data packets. Therefore, in the embodiment of the present invention, the first interest packet may subscribe to multiple data packets. However, in the prior art, one interest packet can subscribe only to one data packet. Therefore, the number of first interest packets in the content network can be reduced. Therefore, in the embodiment of the present invention, the first interest packet may also be referred to as a long term interest packet.

520. When a PIT has a second subscription entry corresponding to the first content identifier, the forwarding node adds a second port number used in receiving the first interest packet to the second subscription entry, so that a subscription request through a second port represented by the second port number and corresponding to the first content identifier is valid within a first valid duration.

Specifically, the PIT may be stored in the other forwarding node. The PIT may include multiple subscription entries. The subscription entry may include subscription information related to a content identifier. For example, the second subscription entry may include the first content identifier and the second port number. In addition, the second subscription entry may further include other related information, which is not limited in the embodiment of the present invention.

530. The forwarding node receives multiple data packets corresponding to the content indicated by the first content identifier from the content providing device within the first valid duration.

540. The forwarding node forwards the multiple data packets to the content network node, so that the content network node forwards the multiple data packets to the UE after receiving the multiple data packets.

If the PIT has the second subscription entry, which may indicate that the current content network node subscribed to the same content from the forwarding node, the forwarding node may add the second port number to the second subscription entry. Because the second port number is a port number used by the forwarding node to receive the first interest packet, the second port number may represent a communication path between the forwarding node and the content network node. In this way, when the content providing device returns the multiple data packets corresponding to the content to be subscribed to, the forwarding node may forward the multiple data packets to the content network node according to the second port number.

Because the PIT has the second subscription entry, the second port number is added to the second subscription entry, so that the subscription request through the second port represented by the second port number and corresponding to the first content identifier is valid within the first valid duration; and the multiple data packets corresponding to the content to be subscribed to are received from the content providing device within the first valid duration, so that the corresponding data packets can be returned to the content network node. Therefore, within the first valid duration, the content network node does not need to send the first interest packet repeatedly to subscribe to the same content, which can reduce the number of interest packets in the content network. In addition, because the first interest packet can be used to subscribe to multiple data packets, pipeline processing in the prior art is unnecessary; meanwhile, because the number of interest packets can be reduced, overhead of the PIT can be reduced.

In the embodiment of the present invention, the second port number is added to the second subscription entry of the PIT, so that the subscription request through the second port represented by the second port number and corresponding to the first content identifier is valid within the first valid duration; and the multiple data packets corresponding to the content to be subscribed to are received from the content providing device within the first valid duration, so that the corresponding data packets can be returned to the content network node. Therefore, within the first valid duration, the content network node does not need to send the first interest packet repeatedly to subscribe to the same content, which can reduce the number of interest packets in the content network, reduce network signaling overhead, and improve forwarding efficiency (that is, multiple data packets can be received within a duration after one first interest packet is sent).

Optionally, as another embodiment, the forwarding node may receive a second interest packet from the content network node, where the second interest packet includes the first content identifier. The forwarding node may update the first valid duration to a second valid duration according to the second interest packet, and enable a subscription request through the second port represented by the second port number and corresponding to the first content identifier to be valid within the second valid duration. The forwarding node may request the multiple data packets corresponding to the content indicated by the first content identifier from the content providing device, and receive the multiple data packets from the content providing device within the second valid duration. Then, the forwarding node forwards the multiple data packets obtained by requesting to the content network node within the second valid duration, so that the content network node forwards the multiple data packets to the UE after receiving the multiple data packets.

Specifically, a frame structure of the second interest packet may be the same as or different from a frame structure of the first interest packet, which is not limited in the embodiment of the present invention.

In order to maintain the subscription request from the UE, the content network node may send the second interest packet to the forwarding node within the first valid duration. For example, the content network node may send the second interest packet periodically within the first valid duration, where the sending interval may be ½, ⅓, or ¼ of the first valid duration. This allows a packet loss to a certain extent, thereby improving stability and reliability of the system. In addition, the content network node may also send the second interest packet aperiodically within the first valid duration, which is not limited in the embodiment of the present invention. In the embodiment of the present invention, the second interest packet may also be referred to as a keep alive interest packet.

After receiving the second interest packet, the forwarding node may update the first valid duration to a second valid duration, so that the subscription request is valid within the second valid duration, so as to maintain the subscription request.

The second valid duration may be the same as or different from the first valid duration, which is not limited in the embodiment of the present invention.

In this way, after the first valid duration is updated to the second valid duration, the forwarding node may keep requesting, within the second valid duration, multiple data packets corresponding to the content to be subscribed to from the content providing device, and then return the multiple data packets to the content network node according to the second port number. The content network node may return the multiple data packets to the UE according to the first port number.

Optionally, as another embodiment, after the forwarding node forwards the multiple data packets obtained by requesting to the content network node within the first valid duration, the forwarding node may keep the second port number in the second subscription entry undeleted, and retain the second port number within the first valid duration.

Specifically, after forwarding the multiple data packets to the content network node within the first valid duration, the forwarding node keeps the second port number in the second subscription entry undeleted, so as to keep the subscription request to be valid within the first valid duration.

Optionally, as another embodiment, after the forwarding node forwards the multiple data packets obtained by requesting to the content network node within the second valid duration, the forwarding node keeps the second port number in the second subscription entry undeleted, and retains the second port number within the second valid duration.

Optionally, as another embodiment, the forwarding node may determine whether the multiple data packets corresponding to the content indicated by the first content identifier are stored locally. When a determining result is yes, the forwarding node may forward the multiple data packets to the content network node, so that the content network node forwards the multiple data packets to the UE after receiving the multiple data packets. When a determining result is no, the forwarding node may receive the multiple data packets corresponding to the content indicated by the first content identifier from the content providing device within the first valid duration.

For example, the content network node may instruct the forwarding node whether to query a local memory. For example, in a case where content to be subscribed to is a non-real-time service, the content network node may instruct the forwarding node to query the local memory. Alternatively, the forwarding node may determine whether it is necessary to query the local memory according to whether content to be subscribed to is a non-real-time service. For example, in a case where content to be subscribed to is a non-real-time service, it may be determined that the local memory needs to be queried.

If the multiple data packets corresponding to the content to be subscribed to are stored, the forwarding node may return all the data packets to the content network node in sequence. For example, the forwarding node may query a CS table to determine whether the multiple data packets corresponding to the content to be subscribed to are stored. For example, assuming that the content to be subscribed to is a movie, if all data packets of the movie are stored in the CS table, the forwarding node may return all the data packets of the movie to the content network node in sequence. However, in the prior art, each data packet of the movie needs to be subscribed to by using one interest packet, which cannot implement the subscription to the movie as a whole. In other words, in the prior art, multiple interest packets are required to subscribe to one service. Therefore, in the embodiment of the present invention, the number of interest packets in the content network can be reduced.

If the multiple data packets corresponding to the content to be subscribed to are not stored, for example, the forwarding node finds no corresponding data packet in the CS table, the forwarding node may request the corresponding data packets from the content providing device.

With respect to a real-time service, the forwarding node may directly receive the latest data packets corresponding to the content to be subscribed to from the content providing device without querying the local memory.

Optionally, as another embodiment, the first interest packet may further include a first valid duration identifier, where the first valid duration identifier is used to indicate the first valid duration. The forwarding node may enable, according to the first valid duration identifier, the subscription request through the second port represented by the second port number and corresponding to the first content identifier to be valid within the first valid duration indicated by the first valid duration identifier.

Specifically, the content network node may notify the forwarding node of a valid duration of a subscription request from the UE by using the first interest packet. In addition, the first valid duration may also be set in advance by the forwarding node, which is not limited in the embodiment of the present invention.

Optionally, as another embodiment, the second interest packet may further include a second valid duration identifier, where the second valid duration identifier is used to indicate the second valid duration. The forwarding node may enable, according to the second valid duration identifier, the subscription request through the second port represented by the second port number and corresponding to the first content identifier to be valid within the second valid duration indicated by the second valid duration identifier.

Specifically, the content network node may notify, by using the second interest packet, the forwarding node of the second valid duration within which a previous subscription request corresponding to the first content identifier needs to be maintained.

Optionally, as another embodiment, the forwarding node may receive a third interest packet from the content network node, where the third interest packet includes the first content identifier. The forwarding node may invalidate the subscription request through the second port represented by the second port number and corresponding to the first content identifier according to the third interest packet.

Specifically, if no UE corresponding to the content network node needs to subscribe to the content (the content indicated by the first content identifier), the content network node may notify, by using the third interest packet, the forwarding node of unsubscription from the content.

Optionally, as another embodiment, the forwarding node may invalidate the subscription request through the second port represented by the second port number and corresponding to the first content identifier when the first valid duration expires.

Specifically, if the first valid duration expires, which may indicate that the content network node no longer needs the data packets corresponding to the content, the forwarding node may invalidate the subscription request through the second port represented by the second port number and corresponding to the first content identifier, so as to stop forwarding subsequent corresponding data packets to the content network node. This may unsubscribe from the content, thereby using the bandwidth efficiently.

Optionally, as another embodiment, the forwarding node may delete the second port number from the second subscription entry.

Specifically, the forwarding node may delete the second port number, so as to stop forwarding subsequent corresponding data packets to the content network node. This may quickly unsubscribe from the content, thereby using the bandwidth efficiently.

Optionally, as another embodiment, the forwarding node may delete the second subscription entry from the PIT when all port numbers in the second subscription entry are deleted.

In the embodiment of the present invention, the first port number is added to the first subscription entry of the PIT, so that the subscription request through the first port represented by the first port number and corresponding to the first content identifier is valid within the first valid duration, the multiple data packets corresponding to the content to be subscribed to are received from the content providing device within the first valid duration, so that the corresponding data packets can be returned to the content network node. Therefore, within the first valid duration, the content network node does not need to send the first interest packet repeatedly to subscribe to the same content, which can reduce the number of interest packets in the content network, reduce network signaling overhead, and improve forwarding efficiency (that is, multiple data packets can be received within a duration after one first interest packet is sent).

The following describes the embodiments of the present invention in detail with reference to specific examples. It should be noted that these examples are merely used to help a person skilled in the art to have a better understanding of the embodiments of the present invention, and are not intended to limit the scope of the embodiments of the present invention.

Figure 6:
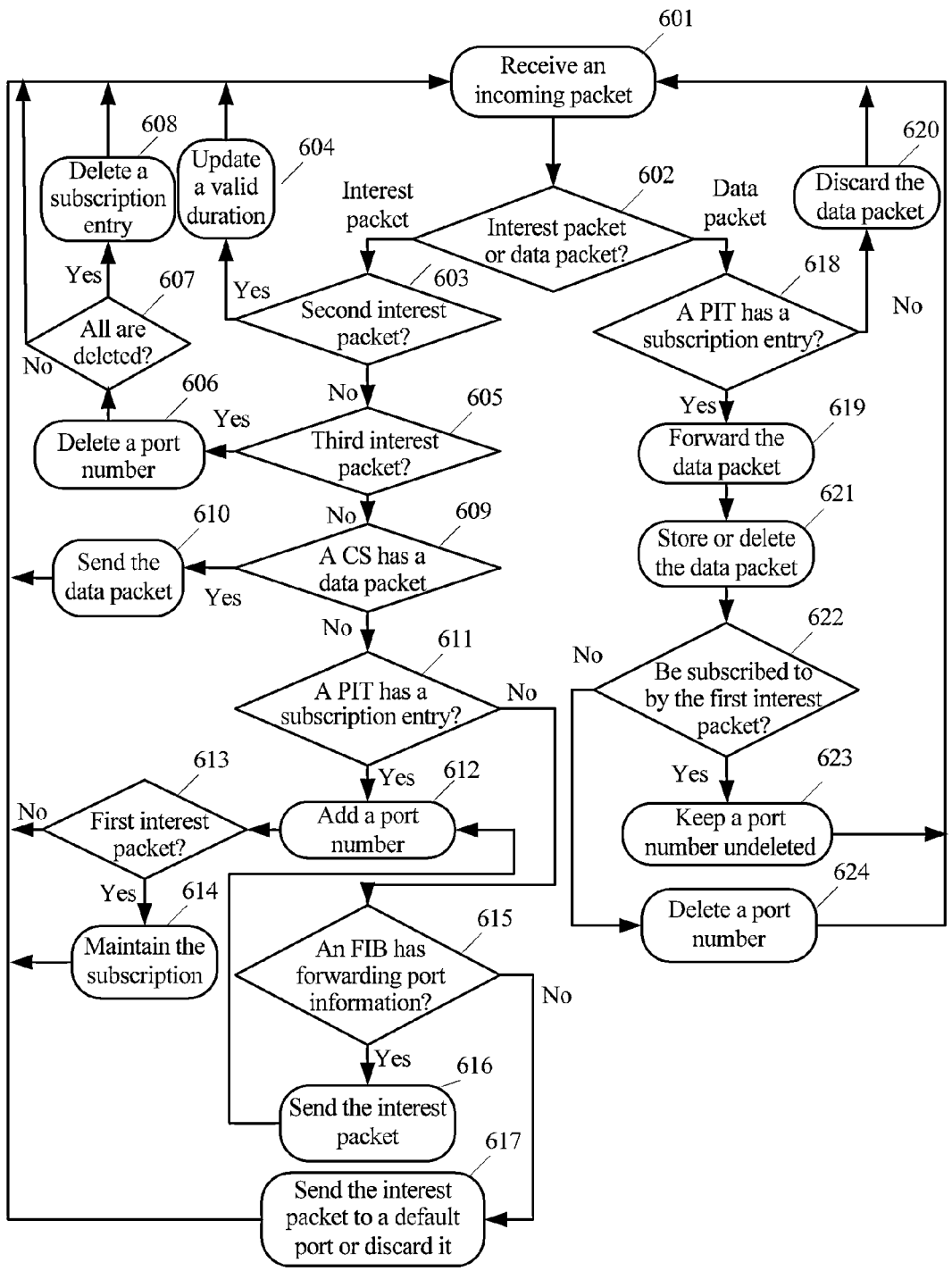
FIG. 6 is a schematic flowchart showing a process of a method for supporting content subscription in a content network according to an embodiment of the present invention.

FIG. 6 is a schematic flowchart showing a process of a method for supporting content subscription in a content network according to an embodiment of the present invention.

601. A content network node receives an incoming packet.

For example, the content network node may be node 120*a*, node 120*b*, or node 120*c* in the scenario shown in FIG. 1.

602. The content network node determines whether the incoming packet is an interest packet or a data packet.

In a case where the incoming packet is an interest packet, step 603 is executed. In a case where the incoming packet is a data packet, step 618 is executed. For example, the content network node may receive an interest packet from UE, and may also receive a data packet from another forwarding node.

603. The content network node determines whether the interest packet is a second interest packet.

When the interest packet is a second interest packet, step 604 is executed. When the interest packet is not a second interest packet, step 605 is executed. The second interest packet may include a content identifier, and the second interest packet may be used to maintain a subscription request for content indicted by the content identifier.

604. When the received interest packet is a second interest packet, the content network node updates a first valid duration in a subscription entry to a second valid duration according to the interest packet, so that a subscription request through a port represented by a port number and corresponding to the content identifier is valid within the second valid duration, where the port number is a port number used in receiving the interest packet.

If the interest packet is a second interest packet, the interest packet may further include a second valid duration identifier, where the second valid duration identifier may be used to indicate the second valid duration. The content network node may keep the subscription request to be valid according to the second interest packet.

After step 604, the content network node may return to an initial state and continue to receive a next incoming packet.

605. The content network node determines whether the interest packet is a third interest packet.

When the interest packet is a third interest packet, step 606 is executed. When the interest packet is not a third interest packet, step 609 is executed. The third interest packet may be used to cancel a subscription request.

606. When the interest packet is a third interest packet, the content network node deletes the port number from the subscription entry according to the third interest packet.

If the UE or another content network node does not need to subscribe to the content, they may notify, by using the third interest packet, the content network node of unsubscription from the content. Then, the content network node may delete the port number from the subscription entry. The port number may be a port number used in receiving the interest packet.

607. The content network node determines whether all port numbers corresponding to the subscription entry in step 606 are deleted.

If all port numbers in the subscription entry are deleted, it may indicate that no UE subscribes to the content, and step 608 is executed. When all port numbers are not deleted, after step 607, the content network node may return to an initial state and continue to receive a next incoming packet.

608. When all port numbers in the subscription entry are deleted, delete the subscription entry from a PIT.

After step 608, the content network node may return to an initial state and continue to receive a next incoming packet.

609. When the interest packet is not a third interest packet, the content network node determines whether a CS has a data packet corresponding to content to be subscribed to.

When the interest packet is not a third interest packet, it indicates that the interest packet may be an interest packet for content subscription.

When the CS table has the data packet corresponding to the content to be subscribed to, step 610 is executed. When the CS table has no data packet corresponding to the content to be subscribed to, step 611 is executed.

610. When the CS table has the data packet corresponding to the content to be subscribed to, the content network node forwards multiple data packets in the CS table corresponding to the content to be subscribed to.

For example, the content network node may return all matching data packets in the CS table to the UE in sequence.

After step 610, the content network node may return to an initial state and continue to receive a next incoming packet.

611. When the CS table has no data packet corresponding to the content to be subscribed to, the content network node determines whether the PIT has a subscription entry corresponding to the content identifier.

When the PIT has the subscription entry, step 612 is executed. When the PIT has no subscription entry, step 615 is executed.

612. When the PIT has the subscription entry, the content network node adds the port number to the subscription entry, where the port number is a port number used in receiving the interest packet.

Specifically, when the PIT has the subscription entry, which may indicate that the content was subscribed to, the content network node may record the port number in the subscription entry.

613. Determine whether the interest packet is a first interest packet.

When the interest packet is a first interest packet, step 614 is executed.

When the interest packet is not a first interest packet, after step 613, the content network node may return to an initial state and continue to receive a next incoming packet.

614. When the interest packet is a first interest packet, the content network node enables a subscription request through the port represented by the port number and corresponding to the content identifier to be valid within a first valid duration.

For example, the content network node may send a second interest packet to the other forwarding node to maintain the subscription request of the content.

After step 614, the content network node may return to an initial state and continue to receive a next incoming packet.

615. When the PIT has no subscription entry, determine whether an FIB has forwarding port information matching the interest packet.

Specifically, when the PIT has no subscription entry, which may indicate that no other UE subscribed to the content, the node may query the FIB for forwarding port information matching the interest packet.

When the FIB has the forwarding port information matching the interest packet, step 616 is executed.

When the FIB has no forwarding port information matching the interest packet, step 617 is executed.

616. Send the interest packet to the other forwarding node according to the forwarding port information found in the FIB, and create a subscription entry in the PIT.

Specifically, the content network node may send the interest packet to the other forwarding node according to the forwarding port information, so as to subscribe to the content from the other forwarding node. Because the PIT has no subscription entry originally, the node may create a subscription entry in the PIT, where the subscription entry may include the content identifier and the port number used in receiving the interest packet.

617. When the FIB has no forwarding port information matching the interest packet, the node sends the interest packet to a default port or discards the interest packet.

618. When the incoming packet is a data packet, determine whether the PIT has a subscription entry corresponding to a content identifier corresponding to the data packet.

When the PIT has the subscription entry, step 619 is executed.

When the PIT has no subscription entry, step 620 is executed.

619. When the PIT has the subscription entry, forward the data packet according to a port number in the subscription entry.

620. When the PIT has no subscription entry, discard the data packet.

When the PIT has no subscription entry, which may indicate that the content corresponding to the data packet is not subscribed to currently, the content network node may discard the data packet.

After step 620, the node may return to an initial state and continue to receive a next incoming packet.

621. After the data packet is forwarded, store or delete the data packet according to a storage policy.

622. The node determines whether the subscription content matching the data packet is subscribed to by the first interest packet.

When the subscription content is subscribed to by the first interest packet, step 623 is executed.

When the subscription content is not subscribed to by the first interest packet, step 624 is executed.

623. When the subscription content is subscribed to by the first interest packet, the node keeps the port number in the subscription entry undeleted.

In this way, when a subsequent data packet corresponding to the subscription content is received, the subsequent data packet may be forwarded to the UE according to the port number. The UE does not need to subscribe to the content repeatedly by using the interest packet, which can reduce the number of interest packets in the content network.

After step 623, the node may return to an initial state and continue to receive a next incoming packet.

624. When the subscription content is not subscribed to by the first interest packet, the node deletes the port number from the subscription entry.

After step 624, the node may return to an initial state and continue to receive a next incoming packet.

In the embodiment of the present invention, the subscription request through the port represented by the port number and corresponding to the content identifier is valid within the valid duration, so that the multiple data packets corresponding to the content to be subscribed to that are requested from the content providing device can be received from the other forwarding node within the first valid duration, and the corresponding data packets can be returned to the UE. Therefore, within the valid duration, the UE does not need to send the first interest packet repeatedly to subscribe to the same content, which can reduce the number of interest packets in the content network.

The first interest packet, the second interest packet, and the third interest packet may be represented by using the same data structure. The data structure may include a type field, used to indicate an interest packet type, for example, a first interest packet, a second interest packet, or a third interest packet. In addition, according to actual conditions, the interest packet may further include other fields of an interest packet in the prior art, which is not limited in the embodiment of the present invention.

Figure 7:
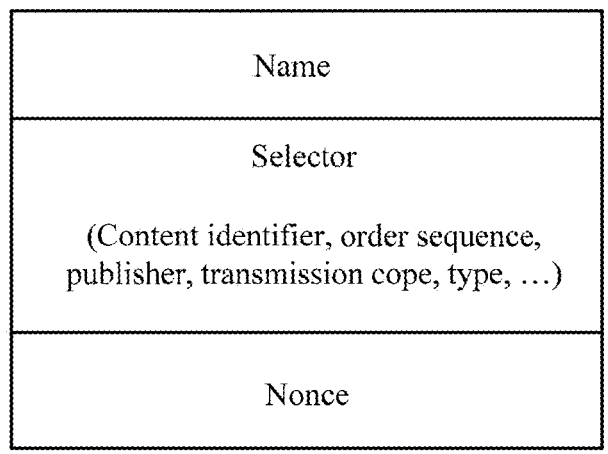
FIG. 7 is a schematic diagram of an example of a data structure of an interest packet in a content network according to an embodiment of the present invention.

FIG. 7 is a schematic diagram of an example of a data structure of an interest packet in a content network according to an embodiment of the present invention.

As shown in FIG. 7, the interest packet may include three parts, namely, a name (Name), a selector (Selector), and a nonce (Nonce). For example, a type (Type) field may be added to the selector part, where the type field may be used to indicate whether the interest packet is a first interest packet, a second interest packet, or a third interest packet. In addition, the selector part may further include a content identifier field. When the interest packet is a first interest packet, the content identifier field may be used to indicate content to be subscribed to by the first interest packet; when the interest packet is a second interest packet, the content identifier field may be used to indicate content corresponding to a subscription request to be maintained by the second interest packet; and when the interest packet is a third interest packet, the content identifier field may be used to indicate content corresponding to a subscription request to be unsubscribed from by the third interest packet. Reference may be made to the prior art for other content that may be included in the interest packet. For example, an order preference (order preference), a publisher (publisher filter), and a transmission scope (scope), and the like may further be included. This will not be described herein to avoid repetition.

The following describes a result of comparing the solution according to the embodiments of the present invention with the solution of the prior art in detail with reference to specific examples. It should be noted that these examples are merely used to help a person skilled in the art to have a better understanding of the embodiments of the present invention, and are not intended to limit the scope of the embodiments of the present invention.

Figure 8:
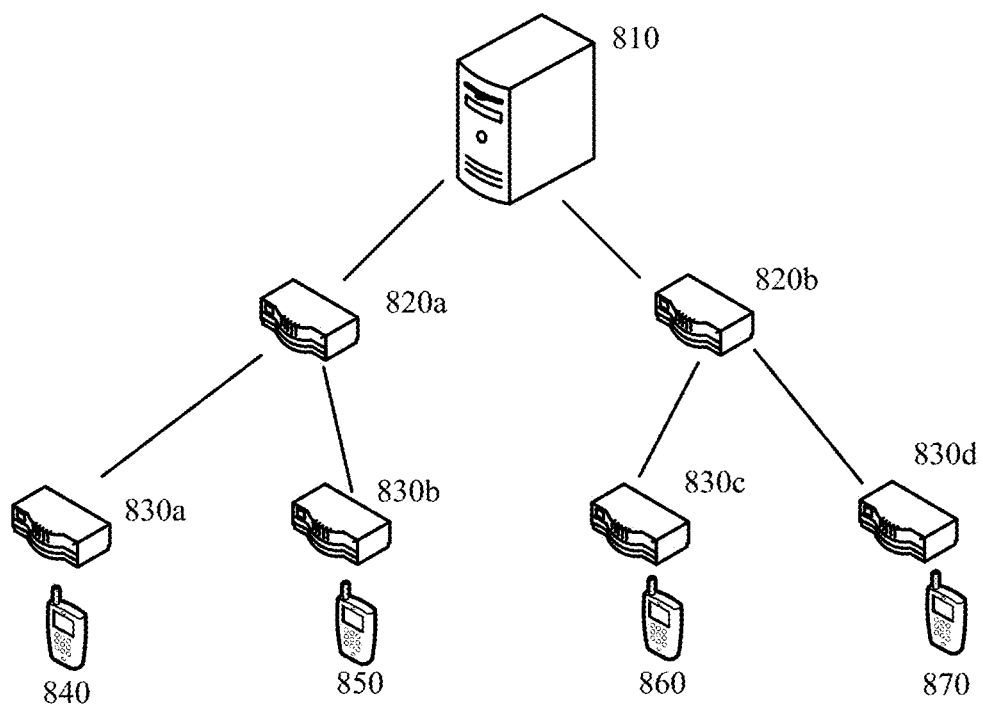
FIG. 8 is a schematic topology diagram of a scenario to which an embodiment of the present invention is applicable.

FIG. 8 is a schematic topology diagram of a scenario to which an embodiment of the present invention is applicable.

The scenario shown in FIG. 8 is an example of a real-time media stream scenario. As shown in FIG. 8, node 820*a* and node 820*b* may communicate with server 810. Node 830*a* and node 830*b* may communicate with node 820*a*, and node 830*c* and node 830*d* may communicate with node 820*b*. Node 830*a* may communicate with UE 840. Node 830*b* may communicate with UE 850. Node 830*c* may communicate with UE 860. Node 830*d* may communicate with UE 870.

Figure 9:
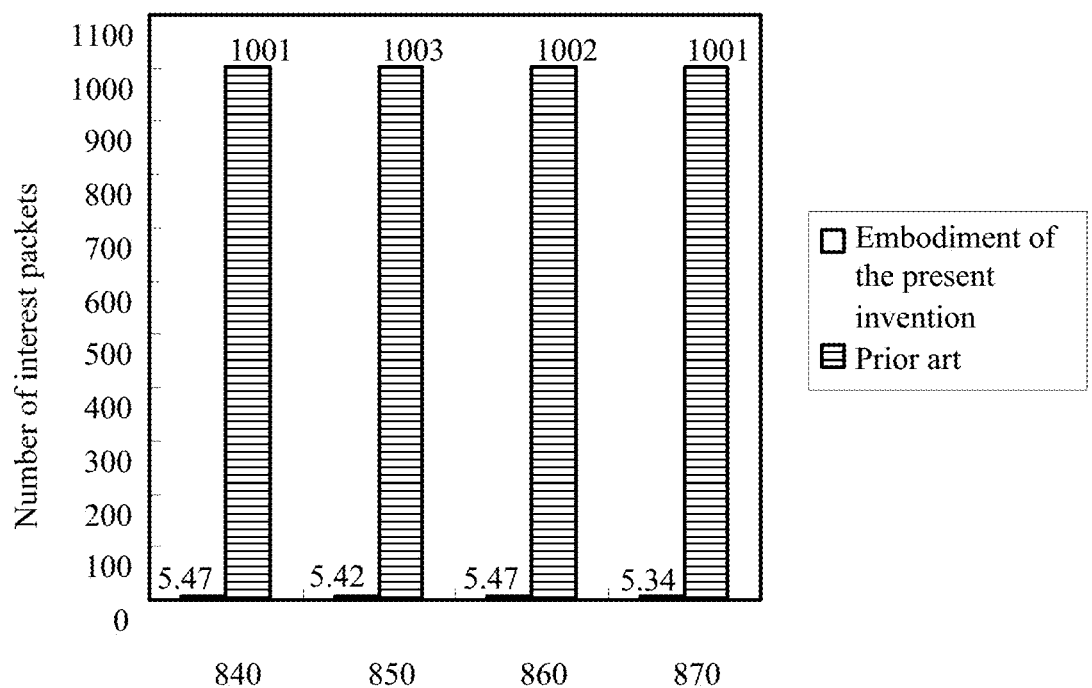
FIG. 9 is a diagram showing a comparison result of respectively performing a solution according to an embodiment of the present invention and a solution of the prior art in the scenario shown in FIG. 8.

In the scenario in FIG. 8, it is assumed that a transmission bit rate is 400 kbps, and the number of pipelines is 10. If the UE each need to subscribe to 1000 data packets, the numbers of interest packets to be sent respectively by using the solution of the embodiment of the present invention and the solution of the prior art are shown in FIG. 9. FIG. 9 is a diagram showing a comparison result of respectively performing a solution according to an embodiment of the present invention and a solution of the prior art in the scenario shown in FIG. 8. As can be seen from FIG. 9, in the embodiment of the present invention, if each UE needs to subscribe to 1000 data packets, the UE needs to send about five interest packets respectively to corresponding node 830*a* to node 830*d*. However, by using the solution of the prior art, if each UE needs to subscribe to 1000 data packets, the UE needs to send about 1000 interest packets respectively to corresponding node 830*a* to node 830*d*. It is obvious that in the embodiment of the present invention, the number of interest packets can be reduced.

In addition, in the scenario shown in FIG. 8, a result of comparing PIT overhead in the embodiment of the present invention with PIT overhead in the prior art is shown in Table 1. As can be seen from Table 1, in the embodiment of the present invention, the PIT overhead in a server and PIT overhead in UE both are smaller than PIT overhead in the prior art.

TABLE 1

| PIT overhead comparison | | |
|---|---|---|
| | Embodiment of the Present Invention | Prior Art |
| PIT overhead in server | 1 | 5-6 |
| PIT overhead in UE | 1 | 9-10 |

In addition, in the embodiment of the present invention, because the UE side no longer needs to perform pipeline processing, a handling process on the UE side can be simplified.

Figure 10:
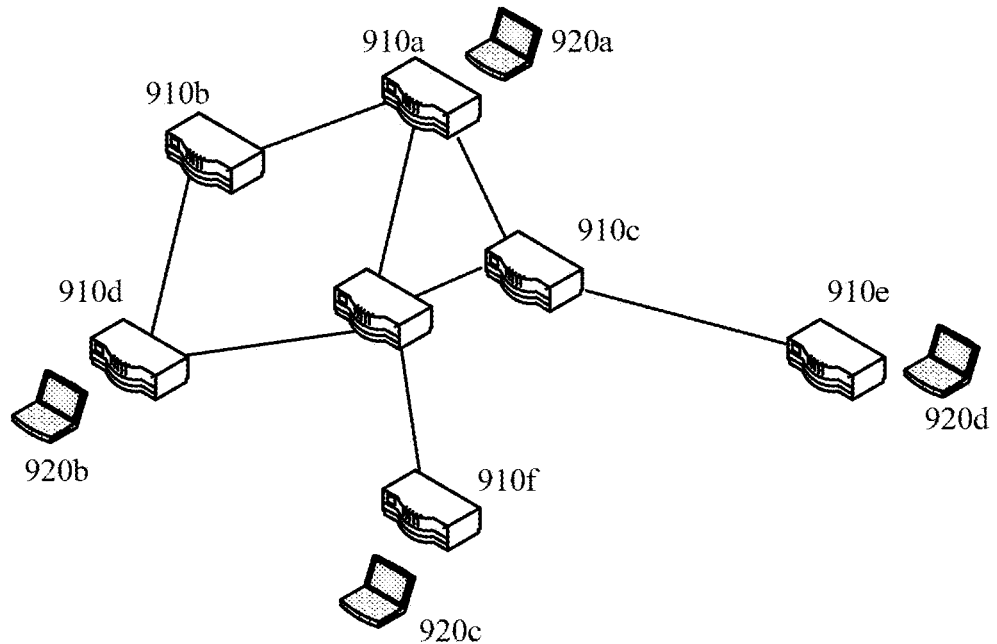
FIG. 10 is a schematic topology diagram of another scenario to which an embodiment of the present invention is applicable.

FIG. 10 is a schematic topology diagram of another scenario to which an embodiment of the present invention is applicable.

The scenario shown in FIG. 10 is an example of an online audio conference scenario. Communication paths between nodes are shown in FIG. 10. Node 910*a* may communicate with UE 920*a*. Node 910*d* may communicate with UE 920*b*. Node 910*f* may communicate with UE 920*c*. Node 910*e* may communicate with UE 920*d*. Based on the topology shown in FIG. 10, an audio conference may be held among the UE.

Figure 11:
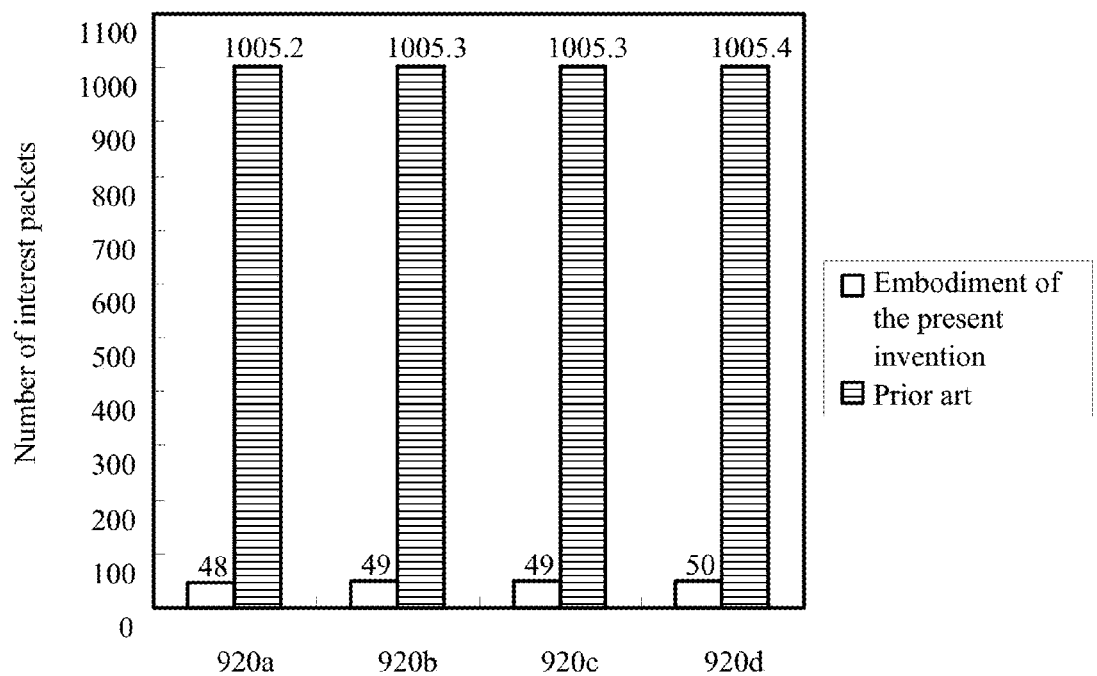
FIG. 11 is a diagram showing a comparison result of respectively performing a solution according to an embodiment of the present invention and a solution of the prior art in the scenario shown in FIG. 10.

In the scenario shown in FIG. 10, it is assumed that a transmission bit rate is 40 kbps, and the number of pipelines is 2. If the UE each need to subscribe to 1000 data packets, the numbers of interest packets to be sent respectively by using the solution of the embodiment of the present invention and the solution of the prior art are shown in FIG. 11. FIG. 11 is a diagram showing a comparison result of respectively performing a solution according to an embodiment of the present invention and a solution of the prior art in the scenario shown in FIG. 10. As can be seen from FIG. 11, in the embodiment of the present invention, UE 920*a* needs to send 48 interest packets to node 910*a* to subscribe to 1000 data packets. UE 920*b* needs to send 49 interest packets to node 910*d* to subscribe to 1000 data packets. UE 920*c* needs to send 49 interest packets to node 910*f* to subscribe to 1000 data packets. UE 920*d* needs to send 50 interest packets to node 910*e* to subscribe to 1000 data packets.

In the prior art, UE 920*a* needs to send 1005.2 interest packets to node 910*a* to subscribe to 1000 data packets. UE 920*b* needs to send 1005.3 interest packets to node 910*d* to subscribe to 1000 data packets. UE 920*c* needs to send 1005.3 interest packets to node 910*f* to subscribe to 1000 data packets. UE 920*d* needs to send 1005.4 interest packets to node 910*e* to subscribe to 1000 data packets.

It is obvious that in the embodiment of the present invention, the number of interest packets can be reduced.

In addition, in the scenario shown in FIG. 10, a result of comparing PIT overhead in the embodiment of the present invention with PIT overhead in the prior art is shown in Table 2. As can be seen from Table 2, in the embodiment of the present invention, PIT overhead in the UE all are smaller than PIT overhead in the prior art.

TABLE 2

| PIT overhead comparison | | |
|---|---|---|
| | Embodiment of the Present Invention | Prior Art |
| PIT overhead in UE 920a | 4 | 7 |
| PIT overhead in UE 920b | 4 | 7 |
| PIT overhead in UE 920c | 4 | 7-8 |
| PIT overhead in UE 920d | 4 | 6 |

In addition, in the embodiment of the present invention, because the UE side no longer needs to perform pipeline processing, a handling process on the UE side can be simplified.

Figure 12:
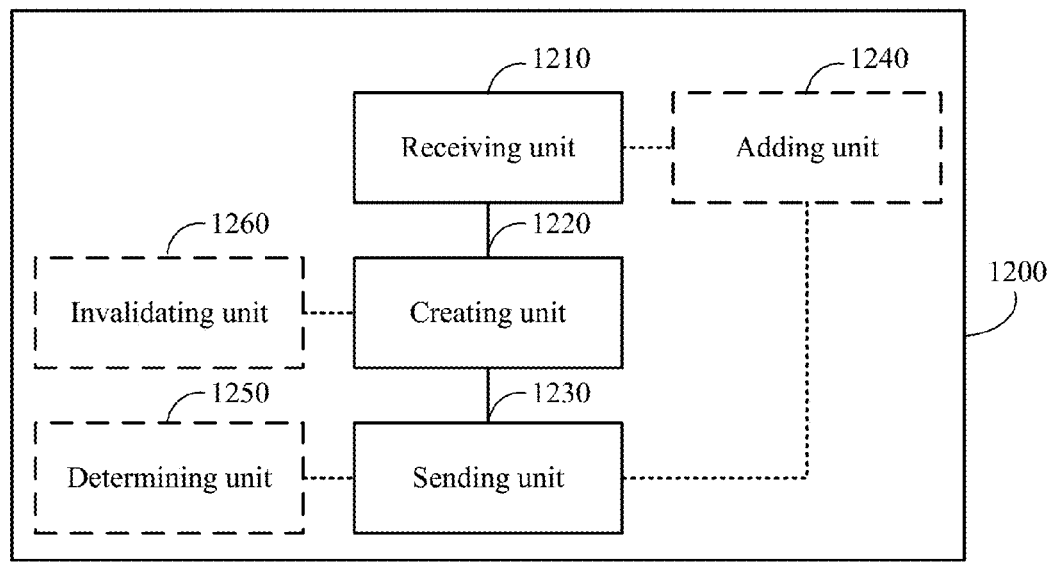
FIG. 12 is a schematic block diagram of a content network node according to an embodiment of the present invention.

FIG. 12 is a schematic block diagram of a content network node according to an embodiment of the present invention. For example, a content network node 1200 may be node 120*a* or node 120*b* shown in FIG. 1. The content network node 1200 may communicate with a content providing device through one or more other forwarding nodes. The content network node 1200 includes a receiving unit 1210, a creating unit 1220, and a sending unit 1230.

The receiving unit 1210 receives a first interest packet from a UE, where the first interest packet includes a first content identifier, and the first content identifier is used to indicate content to be subscribed to by the first interest packet. When a PIT has no first subscription entry corresponding to the first content identifier obtained from the receiving unit 1210, the creating unit 1220 creates the first subscription entry, where the first subscription entry includes the first content identifier and a first port number used in receiving the first interest packet, and the first content identifier corresponds to the first port number, so that a subscription request through a first port represented by the first port number and corresponding to the first content identifier is valid within a first valid duration. The sending unit 1230 receives the first interest packet from the receiving unit 1210 and forwards the first interest packet to the other forwarding node, so that the other forwarding node requests multiple data packets corresponding to the content indicated by the first content identifier from the content providing device within the first valid duration after receiving the first interest packet, and send the multiple data packets obtained by requesting to the content network node. The receiving unit 1210 further receives the multiple data packets. The sending unit 1230 further receives the multiple data packets from the receiving unit 1210, and forwards the multiple data packets to the UE.

In the embodiment of the present invention, the first subscription entry is created in the PIT, so that the subscription request through the first port represented by the first port number and corresponding to the first content identifier is valid within the first valid duration, and the first interest packet is forwarded to the other forwarding node, so that the multiple data packets requested from the content providing device and corresponding to the content to be subscribed to can be received from the other forwarding node within the first valid duration, and the corresponding data packets can be returned to the UE. Therefore, within the first valid duration, the UE does not need to send the first interest packet repeatedly to subscribe to the same content, which can reduce the number of interest packets in the content network, reduce network signaling overhead, and improve forwarding efficiency (that is, multiple data packets can be received within a duration after one first interest packet is sent).

In addition, because the first interest packet can be used to subscribe to multiple data packets, pipeline processing in the prior art is unnecessary; meanwhile, because the number of interest packets can be reduced, overhead of the PIT can be reduced.

Reference may be made to the processes of the method embodiments in FIG. 2 and FIG. 6 to FIG. 11 for other functions or operations of the content network node 1200, which are not described herein to avoid repetition.

Optionally, as an embodiment, the content network node 1200 may further include an adding unit 1240. When the PIT has the first subscription entry, the adding unit 1240 may add the first port number to the first subscription entry, so that a subscription request through the first port and corresponding to the first content identifier is valid within the first valid duration. The receiving unit 1210 may further receive multiple data packets from the content providing device and corresponding to the content indicated by the first content identifier that are forwarded by the other forwarding node within the first valid duration. The sending unit 1230 may further forward the multiple data packets to the UE.

Optionally, as another embodiment, after the sending unit 1230 forwards the first interest packet to the other forwarding node, the other forwarding node creates a second subscription entry after receiving the first interest packet, where the second subscription entry includes the first content identifier and the first valid duration. The sending unit 1230 may further send a second interest packet to the other forwarding node, where the second interest packet may include the first content identifier, so that the other forwarding node updates the first valid duration to a second valid duration after receiving the second interest packet, and a subscription request through a second port represented by a second port number and corresponding to the first content identifier is valid within the second valid duration, where the second port number is a port number used by the other forwarding node to receive the second interest packet. The receiving unit 1210 may further receive the multiple data packets from the content providing device and corresponding to the content indicated by the first content identifier that are forwarded by the other forwarding node within the second valid duration. The sending unit 1230 may further forward the multiple data packets to the UE.

Optionally, as another embodiment, after the receiving unit 1210 forwards the received multiple data packets to the UE, the creating unit 1220 may keep the first port number in the first subscription entry undeleted, and retain the first port number within the first valid duration.

Optionally, as another embodiment, the content network node 1200 may further include a determining unit 1250. The determining unit 1250 may determine whether the multiple data packets corresponding to the content indicated by the first content identifier are stored locally. When the determining unit 1250 determines that the multiple data packets are stored locally, the sending unit 1230 may further forward the multiple data packets to the UE. When the determining unit 1250 determines that the multiple data packets are not stored locally, the sending unit 1230 may forward the first interest packet to the other forwarding node.

Optionally, as another embodiment, the sending unit 1230 may forward the first interest packet to the other forwarding node without querying the local memory.

Optionally, as another embodiment, the first interest packet may further include a first valid duration identifier, where the first valid duration identifier is used to indicate the first valid duration. The creating unit 1220 may enable, according to the first valid duration identifier, the subscription request through the first port represented by the first port number and corresponding to the first content identifier to be valid within the first valid duration indicated by the first valid duration identifier.

Optionally, as another embodiment, the second interest packet may further include a second valid duration identifier, where the second valid duration identifier is used to indicate the second valid duration. The sending unit 1230 may forward the second interest packet to the other forwarding node, so that the other forwarding node enables, according to the second valid duration identifier, the subscription request through the second port represented by the second port number and corresponding to the first content identifier to be valid within the second valid duration indicated by the second valid duration identifier.

Optionally, as another embodiment, the content network node 1200 may further include an invalidating unit 1260. The receiving unit 1210 may further receive a third interest packet from the UE, where the third interest packet includes the first content identifier. The invalidating unit 1260 may invalidate the subscription request through the first port represented by the first port number and corresponding to the first content identifier according to the third interest packet.

Optionally, as another embodiment, the invalidating unit 1260 may further invalidate the subscription request through the first port represented by the first port number and corresponding to the first content identifier when the first valid duration expires.

Optionally, as another embodiment, the invalidating unit 1260 may delete the first port number from the first subscription entry.

Optionally, as another embodiment, the creating unit 1220 may delete the first subscription entry from the PIT when all port numbers in the first subscription entry are deleted.

Optionally, as another embodiment, the sending unit 1230 may further send the third interest packet to the other forwarding node after the first port number is deleted from the first subscription entry and in a case where no other port number corresponds to the first content identifier, so that the other forwarding node invalidates the subscription request through the second port represented by the second port number and corresponding to the first content identifier after receiving the third interest packet.

In the embodiment of the present invention, the first subscription entry is created in the PIT, so that the subscription request through the first port represented by the first port number and corresponding to the first content identifier is valid within the first valid duration, and the first interest packet is forwarded to the other forwarding node, so that the multiple data packets requested from the content providing device and corresponding to the content to be subscribed to can be received from the other forwarding node within the first valid duration, and the corresponding data packets can be returned to the UE. Therefore, within the first valid duration, the UE does not need to send the first interest packet repeatedly to subscribe to the same content, which can reduce the number of interest packets in the content network.

In addition, because the first interest packet can be used to subscribe to multiple data packets, pipeline processing in the prior art is unnecessary; meanwhile, because the number of interest packets can be reduced, overhead of the PIT can be reduced.

Figure 13:
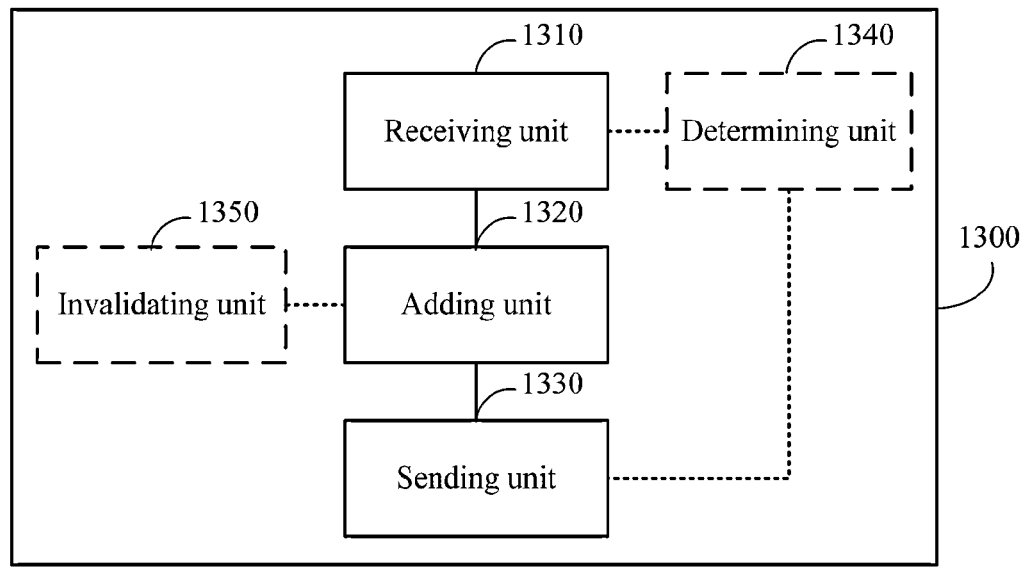
FIG. 13 is a schematic block diagram of a content network node according to another embodiment of the present invention.

FIG. 13 is a schematic block diagram of a content network node according to another embodiment of the present invention. For example, a content network node 1300 may be node 120a or node 120b shown in FIG. 1. The content network node 1300 may communicate with a content providing device through one or more other forwarding nodes. The content network node 1300 includes a receiving unit 1310, an adding unit 1320, and a sending unit 1330.

The receiving unit 1310 receives a first interest packet from UE, where the first interest packet includes a first content identifier, and the first content identifier is used to indicate content to be subscribed to by the first interest packet. When a PIT has a first subscription entry corresponding to the first content identifier obtained from the receiving unit 1310, the adding unit 1320 adds a first port number used in receiving the first interest packet to the first subscription entry, so that a subscription request through a first port represented by the first port number and corresponding to the first content identifier is valid within a first valid duration. The receiving unit 1310 further receives multiple data packets from the content providing device and corresponding to the content indicated by the first content identifier that are forwarded by the other forwarding node within the first valid duration. The sending unit 1330 receives the multiple data packets from the receiving unit 1310, and forwards the multiple data packets to the UE.

In the embodiment of the present invention, the first port number is added to the first subscription entry of the PIT, so that the subscription request through the first port represented by the first port number and corresponding to the first content identifier is valid within the first valid duration, and the multiple data packets corresponding to the content to be subscribed to that are required by the other forwarding node from the content providing device are received, so that the corresponding data packets can be returned to the UE. Therefore, within the first valid duration, the UE does not need to send the first interest packet repeatedly to subscribe to the same content, which can reduce the number of interest packets in the content network, reduce network signaling overhead, and improve forwarding efficiency (that is, multiple data packets can be received within a duration after one first interest packet is sent).

In addition, because the first interest packet can be used to subscribe to multiple data packets, pipeline processing in the prior art is unnecessary; meanwhile, because the number of interest packets can be reduced, overhead of the PIT can be reduced.

Reference may be made to the processes of the method embodiments in FIG. 3 and FIG. 6 to FIG. 11 for other functions and operations of the content network node 1300, which are not described herein to avoid repetition.

Optionally, as an embodiment, the sending unit 1330 may further send a second interest packet to the other forwarding node, where the second interest packet includes the first content identifier, so that the other forwarding node updates the first valid duration to a second valid duration after the second interest packet is received and when a PIT of the other forwarding node has a second subscription entry, where the second subscription entry includes the first content identifier and the first valid duration, and a subscription request through a second port represented by a second port number and corresponding to the first content identifier is valid within the second valid duration, where the second port number is a port number used by the other forwarding node to receive the second interest packet. The receiving unit 1310 may further receive multiple data packets from the content providing device and corresponding to the content indicated by the first content identifier that are forwarded by the other forwarding node within the second valid duration. The sending unit 1330 may further forward the multiple data packets to the UE.

Optionally, as another embodiment, after the sending unit 1330 forwards the multiple data packets to the UE, the adding unit 1320 may keep the first port number in the first subscription entry undeleted, and retain the first port number within the first valid duration.

Optionally, as another embodiment, the content network node 1300 may further include a determining unit 1340. The determining unit 1340 determines whether the multiple data packets corresponding to the content indicated by the first content identifier are stored locally. When the determining unit 1340 determines that the multiple data packets are stored locally, the sending unit 1330 may further forward the multiple data packets to the UE. When the determining unit 1340 determines that the multiple data packets are not stored locally, the receiving unit 1310 may receive the multiple data packets from the content providing device and corresponding to the content indicated by the first content identifier that are forwarded by the other forwarding node within the first valid duration.

Optionally, as another embodiment, the first interest packet may further include a first valid duration identifier, where the first valid duration identifier may be used to indicate the first valid duration. The adding unit 1320 may enable, according to the first valid duration identifier, the subscription request through the first port represented by the first port number and corresponding to the first content identifier to be valid within the first valid duration indicated by the first valid duration identifier.

Optionally, as another embodiment, the second interest packet may further include a second valid duration identifier, where the second valid duration identifier may be used to indicate the second valid duration. The sending unit 1330 may forward the second interest packet to the other forwarding node, so that the other forwarding node enables, according to the second valid duration identifier, the subscription request through the second port represented by the second port number and corresponding to the first content identifier to be valid within the second valid duration indicated by the second valid duration identifier.

Optionally, as another embodiment, the content network node 1300 may further include an invalidating unit 1350. The receiving unit 1310 may further receive a third interest packet from the UE, where the third interest packet includes the first content identifier. The invalidating unit 1350 may invalidate the subscription request through the first port represented by the first port number and corresponding to the first content identifier according to the third interest packet.

Optionally, as another embodiment, the invalidating unit 1350 may invalidate the subscription request through the first port represented by the first port number and corresponding to the first content identifier when the first valid duration expires.

Optionally, as another embodiment, the invalidating unit 1340 may delete the first port number from the first subscription entry.

Optionally, as another embodiment, the adding unit 1320 may further delete the first subscription entry from the PIT when all port numbers in the first subscription entry are deleted.

Optionally, as another embodiment, the sending unit 1330 may further send the third interest packet to the other forwarding node after the first port number is deleted from the first subscription entry and in a case where no other port number corresponds to the first content identifier, so that the other forwarding node invalidates the subscription request through the second port represented by the second port number and corresponding to the first content identifier after receiving the third interest packet.

In the embodiment of the present invention, the first port number is added to the first subscription entry of the PIT, so that the subscription request through the first port represented by the first port number and corresponding to the first content identifier is valid within the first valid duration, and the multiple data packets corresponding to the content to be subscribed to that are required by the other forwarding node from the content providing device are received, so that the corresponding data packets can be returned to the UE. Therefore, within the first valid duration, the UE does not need to send the first interest packet repeatedly to subscribe to the same content, which can reduce the number of interest packets in the content network.

In addition, because the first interest packet can be used to subscribe to multiple data packets, pipeline processing in the prior art is unnecessary; meanwhile, because the number of interest packets can be reduced, overhead of the PIT can be reduced.

Figure 14:
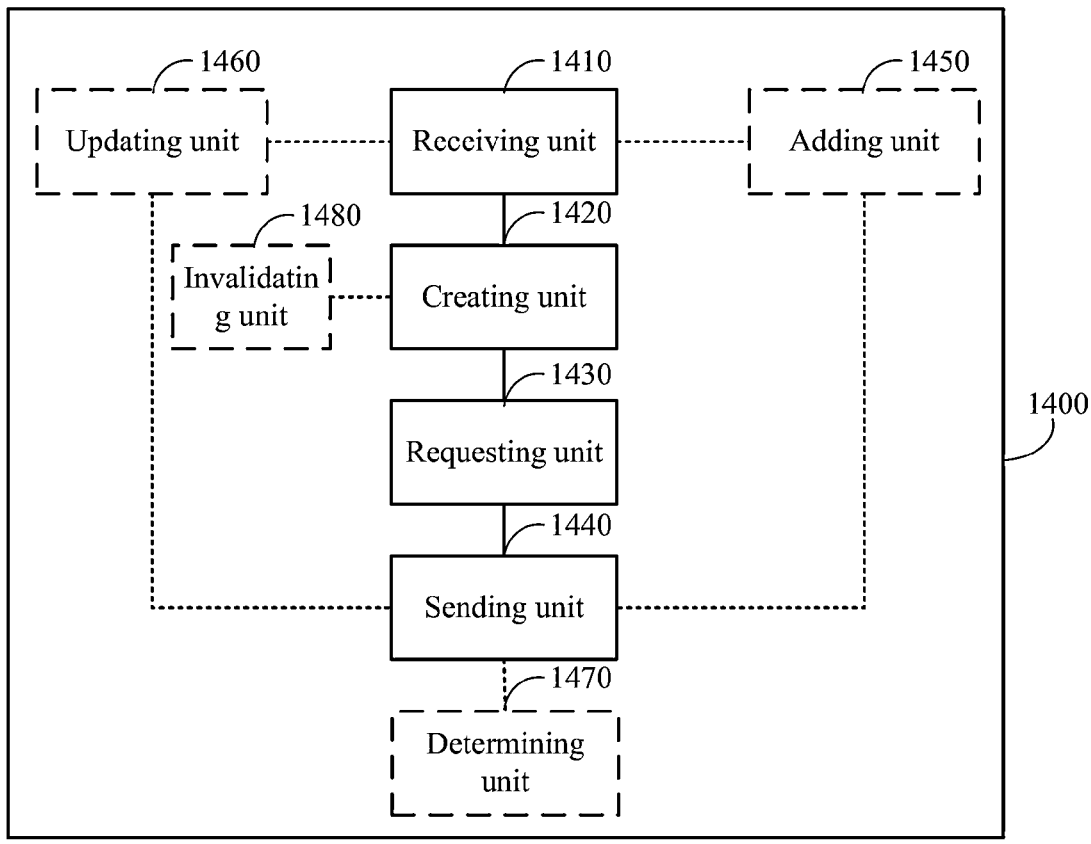
FIG. 14 is a schematic block diagram of a forwarding node according to an embodiment of the present invention.

FIG. 14 is a schematic block diagram of a forwarding node according to an embodiment of the present invention. For example, the forwarding node 1400 may be node 120c shown in FIG. 1. The forwarding node 1400 may communicate with a content network node and a content providing device. The forwarding node 1400 includes a receiving unit 1410, a creating unit 1420, a requesting unit 1430, and a sending unit 1440.

The receiving unit 1410 receives a first interest packet forwarded by the content network node, where the first interest packet is received by the content network node from UE, the first interest packet includes a first content identifier, and the first content identifier is used to indicate content to be subscribed to by the first interest packet. When a PIT has no second subscription entry corresponding to the first content identifier obtained from the receiving unit 1410, the creating unit 1420 creates the second subscription entry, where the second subscription entry includes the first content identifier and a second port number used in receiving the first interest packet, and the first content identifier corresponds to the second port number, so that a subscription request through a second port represented by the second port number and corresponding to the first content identifier is valid within a first valid duration. The requesting unit 1430 requests multiple data packets corresponding to the content indicated by the first content identifier from the content providing device within the first valid duration. The receiving unit 1410 further receives the multiple data packets obtained by requesting by the requesting unit 1430 from the content providing device. The sending unit 1440 obtains the multiple data packets from the receiving unit, and forwards the multiple data packets to the content network node, so that the content network node forwards the multiple data packets to the UE after receiving the multiple data packets.

In the embodiment of the present invention, the second subscription entry is created in the PIT, so that the subscription request through the second port represented by the second port number and corresponding to the first content identifier is valid within the first valid duration; and the multiple data packets corresponding to the content to be subscribed to are requested from the content providing device within the first valid duration (where a request may be initiated at intervals), so that the forwarding node may return the data packets received from the content providing device to the content network node within the first valid duration. Therefore, within the first valid duration, the content network node does not need to send the first interest packet repeatedly to subscribe to the same content, which can reduce the number of interest packets in the content network, reduce network signaling overhead, and improve forwarding efficiency (that is, multiple data packets can be received within a duration after one first interest packet is sent).

In addition, because the first interest packet can be used to subscribe to multiple data packets, pipeline processing in the prior art is unnecessary; meanwhile, because the number of interest packets can be reduced, overhead of the PIT can be reduced.

Reference may be made to the processes of the method embodiments in FIG. 4 to FIG. 11 for other functions and operations of the forwarding node 1400, which are not described herein to avoid repetition.

Optionally, as an embodiment, the forwarding node 1400 may further include an adding unit 1450. When the PIT has the second subscription entry, the adding unit 1450 may add the second port number to the second subscription entry, so that a subscription request through the second port and corresponding to the first content identifier is valid within the first valid duration. The receiving unit 1410 may further receive the multiple data packets corresponding to the content indicated by the first content identifier from the content providing device within the first valid duration. The sending unit 1440 may further obtain the multiple data packets from the receiving unit 1410, and forward the multiple data packets obtained by requesting to the content network node, so that the content network node forwards the multiple data packets to the UE after receiving the multiple data packets.

Optionally, as another embodiment, the forwarding node 1400 may further include an updating unit 1460. The receiving unit 1410 may further receive a second interest packet from the content network node, where the second interest packet includes the first content identifier. The updating unit 1460 may update the first valid duration to a second valid duration according to the second interest packet, and enable a subscription request through the second port represented by the second port number and corresponding to the first content identifier to be valid within the second valid duration. The receiving unit 1410 may further request the multiple data packets corresponding to the content indicated by the first content identifier from the content providing device, and receive the multiple data packets from the content providing device within the second valid duration. The sending unit 1440 may further forward the multiple data packets obtained by requesting to the content network node within the second valid duration, so that the content network node forwards the multiple data packets to the UE after receiving the multiple data packets.

Optionally, as another embodiment, after the multiple data packets obtained by requesting are forwarded to the content network node within the first valid duration, the creating unit 1420 may keep the second port number in the second subscription entry undeleted, and retain the second port number within the first valid duration.

Optionally, as another embodiment, after the multiple data packets obtained by requesting are forwarded to the content network node within the second valid duration, the updating unit 1460 may keep the second port number in the second subscription entry undeleted, and retain the second port number within the second valid duration.

Optionally, as another embodiment, the forwarding node 1400 may further include a determining unit 1470. The determining unit 1470 may determine whether the multiple data packets corresponding to the content indicated by the first content identifier are stored locally. When the determining unit 1470 determines that the multiple data packets are stored locally, the sending unit 1440 may further forward the multiple data packets to the content network node, so that the content network node forwards the multiple data packets to the UE after receiving the multiple data packets. When the determining unit 1470 determines that the multiple data packets are not stored locally, the requesting unit 1430 may request the multiple data packets corresponding to the content indicated by the first content identifier from the content providing device within the first valid duration.

Optionally, as another embodiment, the requesting unit 1430 may request the multiple data packets corresponding to the content indicated by the first content identifier from the content providing device within the first valid duration without querying the local memory.

Optionally, as another embodiment, the first interest packet may further include a first valid duration identifier, where the first valid duration identifier is used to indicate the first valid duration. The creating unit 1420 may enable, according to the first valid duration identifier, the subscription request through the second port represented by the second port number and corresponding to the first content identifier to be valid within the first valid duration indicated by the first valid duration identifier.

Optionally, as another embodiment, the second interest packet may further include a second valid duration identifier, where the second valid duration identifier is used to indicate the second valid duration. The updating unit 1460 may enable, according to the second valid duration identifier, the subscription request through the second port represented by the second port number and corresponding to the first content identifier to be valid within the second valid duration indicated by the second valid duration identifier.

Optionally, as another embodiment, the forwarding node 1400 may further include an invalidating unit 1480. The receiving unit 1410 may further receive a third interest packet from the content network node, where the third interest packet includes the first content identifier. The invalidating unit 1480 may invalidate the subscription request through the second port represented by the second port number and corresponding to the first content identifier according to the third interest packet.

Optionally, as another embodiment, the invalidating unit 1480 may invalidate the subscription request through the second port represented by the second port number and corresponding to the first content identifier when the second valid duration expires.

Optionally, as another embodiment, the invalidating unit 1480 may delete the second port number from the second subscription entry.

Optionally, as another embodiment, the creating unit 1420 may delete the second subscription entry from the PIT when all port numbers in the second subscription entry are deleted.

Figure 15:
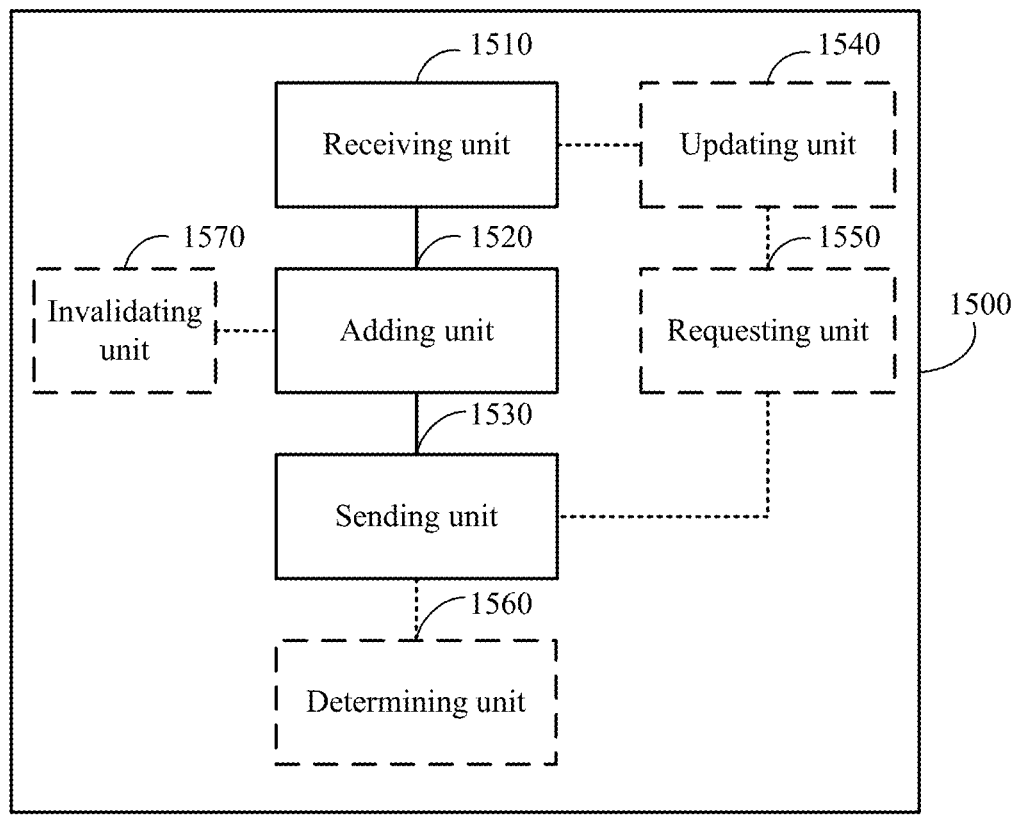
FIG. 15 is a schematic block diagram of a forwarding node according to another embodiment of the present invention.

FIG. 15 is a schematic block diagram of a forwarding node according to another embodiment of the present invention. For example, the forwarding node 1500 may be node 120c shown in FIG. 1. The forwarding node 1500 may communicate with a content network node and a content providing device. The forwarding node 1500 includes a receiving unit 1510, an adding unit 1520, and a sending unit 1530.

The receiving unit 1510 receives a first interest packet forwarded by the content network node, where the first interest packet is received by the content network node from UE, the first interest packet includes a first content identifier, and the first content identifier is used to indicate content to be subscribed to by the first interest packet. When a PIT has a second subscription entry corresponding to the first content identifier obtained from the receiving unit, the adding unit 1520 adds a second port number used in receiving the first interest packet to the second subscription entry, so that a subscription request through a second port represented by the second port number and corresponding to the first content identifier is valid within a first valid duration. The receiving unit 1510 further receives multiple data packets corresponding to the content indicated by the first content identifier from the content providing device within the first valid duration. The sending unit 1530 obtains the multiple data packets from the receiving unit 1510, and forwards the multiple data packets to the content network node, so that the content network node forwards the multiple data packets to the UE after receiving the multiple data packets.

In the embodiment of the present invention, the second port number is added to the second subscription entry of the PIT, so that the subscription request through the second port represented by the second port number and corresponding to the first content identifier is valid within the first valid duration; the multiple data packets corresponding to the content to be subscribed to are received from the content providing device within the first valid duration, so that the corresponding data packets can be returned to the content network node. Therefore, within the first valid duration, the content network node does not need to send the first interest packet repeatedly to subscribe to the same content, which can reduce the number of interest packets in the content network, reduce network signaling overhead, and improve forwarding efficiency (that is, multiple data packets can be received within a duration after one first interest packet is sent).

In addition, because the first interest packet can be used to subscribe to multiple data packets, pipeline processing in the prior art is unnecessary; meanwhile, because the number of interest packets can be reduced, overhead of the PIT can be reduced.

Reference may be made to the processes of the method embodiments in FIG. 5 to FIG. 11 for other functions and operations of the forwarding node 1500, which are not described herein to avoid repetition.

Optionally, as another embodiment, the forwarding node 1500 may further include an updating unit 1540 and a requesting unit 1550. The receiving unit 1510 may further receive a second interest packet from the content network node, where the second interest packet includes the first content identifier. The updating unit 1540 may update the first valid duration to a second valid duration according to the second interest packet, and enable a subscription request through the second port represented by the second port number and corresponding to the first content identifier to be valid within the second valid duration. The requesting unit 1550 may request the multiple data packets corresponding to the content indicated by the first content identifier from the content providing device within the second valid duration. The receiving unit 1510 further receives the multiple data packets from the content providing device. The sending unit 1530 further forwards the multiple data packets obtained by requesting to the content network node within the second valid duration, so that the content network node forwards the multiple data packets to the UE after receiving the multiple data packets.

Optionally, as another embodiment, after the sending unit 1530 forwards the multiple data packets obtained by requesting to the content network node within the first valid duration, the adding unit 1520 may keep the second port number in the second subscription entry undeleted, and retain the second port number within the first valid duration.

Optionally, as another embodiment, after the sending unit 1530 forwards the multiple data packets obtained by requesting to the content network node within the second valid duration, the updating unit 1540 may keep the second port number in the second subscription entry undeleted, and retain the second port number within the second valid duration.

Optionally, as another embodiment, the forwarding node 1500 may further include a determining unit 1560. The determining unit 1560 may determine whether the multiple data packets corresponding to the content indicated by the first content identifier are stored locally. When the determining unit 1560 determines that the multiple data packets are stored locally, the sending unit 1530 may further forward the multiple data packets to the content network node, so that the content network node forwards the multiple data packets to the UE after receiving the multiple data packets. When the determining unit 1560 determines that the multiple data packets are not stored locally, the receiving unit 1510 may receive the multiple data packets corresponding to the content indicated by the first content identifier from the content providing device within the first valid duration.

Optionally, as another embodiment, the first interest packet may further include a first valid duration identifier, where the first valid duration identifier is used to indicate the first valid duration. The adding unit 1520 may enable, according to the first valid duration identifier, the subscription request through the second port represented by the second port number and corresponding to the first content identifier to be valid within the first valid duration indicated by the first valid duration identifier.

Optionally, as another embodiment, the second interest packet may further include a second valid duration identifier, where the second valid duration identifier is used to indicate the second valid duration. The updating unit 1540 may enable, according to the second valid duration identifier, the subscription request through the second port represented by the second port number and corresponding to the first content identifier to be valid within the second valid duration indicated by the second valid duration identifier.

Optionally, as another embodiment, the forwarding node 1500 may further include an invalidating unit 1570. The receiving unit 1510 may further receive a third interest packet from the content network node, where the third interest packet includes the first content identifier. The invalidating unit 1570 may invalidate the subscription request from the UE through the second port represented by the second port number and corresponding to the first content identifier according to the third interest packet.

Optionally, as another embodiment, the invalidating unit 1570 may invalidate the subscription request from the UE through the second port represented by the second port number and corresponding to the first content identifier when the second valid duration expires.

Optionally, as another embodiment, the invalidating unit 1570 may delete the second port number from the second subscription entry.

Optionally, as another embodiment, the adding unit 1520 may delete the second subscription entry from the PIT when all port numbers in the second subscription entry are deleted.

In the embodiment of the present invention, the second port number is added to the second subscription entry of the PIT, so that the subscription request through the second port represented by the second port number and corresponding to the first content identifier is valid within the first valid duration; the multiple data packets corresponding to the content to be subscribed to are received from the content providing device within the first valid duration, so that the corresponding data packets can be returned to the content network node. Therefore, within the first valid duration, the content network node does not need to send the first interest packet repeatedly to subscribe to the same content, which can reduce the number of interest packets in the content network, reduce network signaling overhead, and improve forwarding efficiency (that is, multiple data packets can be received within a duration after one first interest packet is sent).

Figure 16:
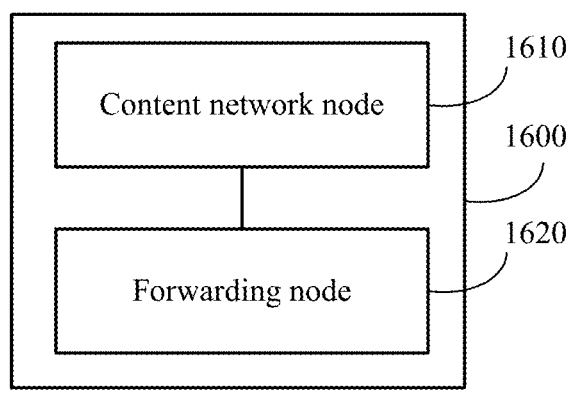
FIG. 16 is a schematic block diagram of a system for supporting content subscription in a content network according to an embodiment of the present invention.

FIG. 16 is a schematic block diagram of a system for supporting content subscription in a content network according to an embodiment of the present invention. A system 1600 includes a content network node 1610 and one or more other forwarding nodes 1620. It should be noted that although FIG. 16 shows only one other forwarding node, in the embodiment of the present invention, there may be more other forwarding nodes.

The content network node 1610 communicates with a content providing device through the other forwarding node 1620.

The content network node 1610 receives a first interest packet from UE, where the first interest packet includes a first content identifier, and the first content identifier is used to indicate content to be subscribed to by the first interest packet.

When a pending interest table PIT has no first subscription entry corresponding to the first content identifier, the content network node 1610 further creates the first subscription entry, where the first subscription entry includes the first content identifier and a first port number used in receiving the first interest packet, and the first content identifier corresponds to the first port number, so that a subscription request through a first port represented by the first port number and corresponding to the first content identifier is valid within a first valid duration.

The content network node 1610 further forwards the first interest packet to the other forwarding node 1620.

The other forwarding node 1620 requests multiple data packets corresponding to the content indicated by the first content identifier from the content providing device within the first valid duration after receiving the first interest packet, and sends the multiple data packets obtained by requesting to the content network node 1610.

The content network node 1610 further forwards the received multiple data packets to the UE.

Reference may be made to the processes of the method embodiments in FIG. 2 and FIG. 6 to FIG. 11 for other functions and operations of the content network node 1610, which are not described herein to avoid repetition.

In the embodiment of the present invention, the content network node creates the first subscription entry in the PIT, so that the subscription request through the first port represented by the first port number and corresponding to the first content identifier is valid within the first valid duration, and forwards the first interest packet to the other forwarding node, so that the multiple data packets requested from the content providing device and corresponding to the content to be subscribed to can be received from the other forwarding node within the first valid duration, and the corresponding data packets can be returned to the UE. Therefore, within the first valid duration, the UE does not need to send the first interest packet repeatedly to subscribe to the same content, which can reduce the number of interest packets in the content network.

In addition, because the first interest packet can be used to subscribe to multiple data packets, pipeline processing in the prior art is unnecessary; meanwhile, because the number of interest packets can be reduced, overhead of the PIT can be reduced.

Figure 17:
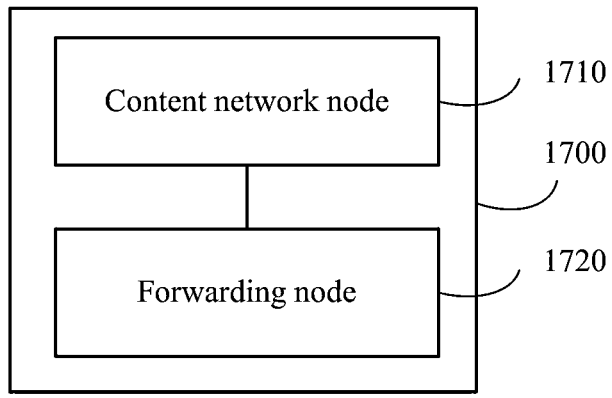
FIG. 17 is a schematic block diagram of a system for supporting content subscription in a content network according to another embodiment of the present invention.

FIG. 17 is a schematic block diagram of a system for supporting content subscription in a content network according to another embodiment of the present invention. A system 1700 includes a content network node 1710 and one or more other forwarding nodes 1720. It should be noted that although FIG. 17 shows only one other forwarding node, in the embodiment of the present invention, there may be more other forwarding nodes.

The content network node 1710 communicates with a content providing device through the other forwarding node 1720.

The content network node 1710 receives a first interest packet from UE, where the first interest packet includes a first content identifier, and the first content identifier is used to indicate content to be subscribed to by the first interest packet. When a pending interest table PIT has a first subscription entry corresponding to the first content identifier, the content network node 1710 further adds a first port number used in receiving the first interest packet to the first subscription entry, so that a subscription request through a first port represented by the first port number and corresponding to the first content identifier is valid within a first valid duration.

The other forwarding node 1720 forwards multiple data packets from the content providing device and corresponding to the content indicated by the first content identifier to the content network node within the first valid duration.

The content network node 1710 further receives multiple data packets from the other forwarding node 1720.

The content network node 1710 further forwards the received multiple data packets to the UE.

Reference may be made to the processes of the method embodiments in FIG. 3 and FIG. 6 to FIG. 11 for other functions and operations of the content network node 1710, which are not described herein to avoid repetition.

In the embodiment of the present invention, the content network node adds the first port number to the first subscription entry of the PIT, so that the subscription request through the first port represented by the first port number and corresponding to the first content identifier is valid within the first valid duration, and receives the multiple data packets corresponding to the content to be subscribed to that are required by the other forwarding node from the content providing device, so that the corresponding data packets can be returned to the UE. Therefore, within the first valid duration, the UE does not need to send the first interest packet repeatedly to subscribe to the same content, which can reduce the number of interest packets in the content network.

In addition, because the first interest packet can be used to subscribe to multiple data packets, pipeline processing in the prior art is unnecessary; meanwhile, because the number of interest packets can be reduced, overhead of the PIT can be reduced.

Figure 18:
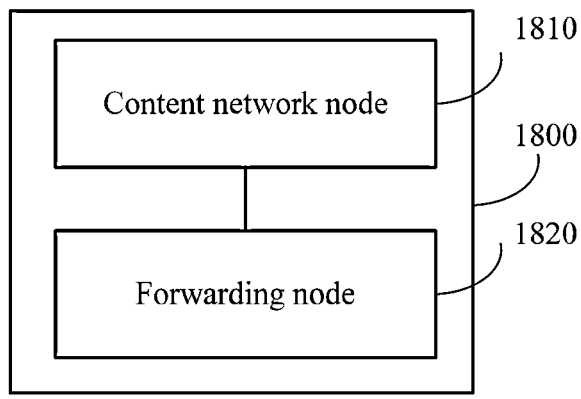
FIG. 18 is a schematic block diagram of a system for supporting content subscription in a content network according to another embodiment of the present invention.

FIG. 18 is a schematic block diagram of a system for supporting content subscription in a content network according to another embodiment of the present invention. A system 1800 includes a content network node 1810 and one or more forwarding nodes 1820. It should be noted that although FIG. 18 shows only one other forwarding node, in the embodiment of the present invention, there may be more other forwarding nodes.

The forwarding node 1820 may communicate with the content network node 1810 and a content providing device.

The content network node 1810 receives a first interest packet from UE, and forwards the first interest packet to the forwarding node 1820, where the first interest packet includes a first content identifier, and the first content identifier is used to indicate content to be subscribed to by the first interest packet.

When a PIT has no second subscription entry corresponding to the first content identifier obtained from the content network node 1810, the forwarding node 1820 creates the second subscription entry, where the second subscription entry includes the first content identifier and a second port number used in receiving the first interest packet, and the first content identifier corresponds to the second port number, so that a subscription request through a second port represented by the second port number and corresponding to the first content identifier is valid within a first valid duration.

The forwarding node 1820 requests multiple data packets corresponding to the content indicated by the first content identifier from the content providing device within the first valid duration.

The forwarding node 1820 further receives the multiple data packets obtained by requesting from the content providing device.

The forwarding node 1820 further forwards the multiple data packets to the content network node 1810.

The content network node 1810 forwards the multiple data packets to the UE after receiving the multiple data packets from the forwarding node 1820.

Reference may be made to the processes of the method embodiments in FIG. 4 to FIG. 11 for other functions and operations of the forwarding node 1820, which are not described herein to avoid repetition.

In the embodiment of the present invention, the forwarding node creates the second subscription entry in the PIT, so that the subscription request through the second port represented by the second port number and corresponding to the first content identifier is valid within the first valid duration, and requests the multiple data packets corresponding to the content to be subscribed to from the content providing device within the first valid duration (where a request may be initiated at intervals), so that the forwarding node may return the data packets received from the content providing device to the content network node within the first valid duration. Therefore, within the first valid duration, the content network node does not need to send the first interest packet repeatedly to subscribe to the same content, which can reduce the number of interest packets in the content network, reduce network signaling overhead, and improve forwarding efficiency (that is, multiple data packets can be received within a duration after one first interest packet is sent).

Figure 19:
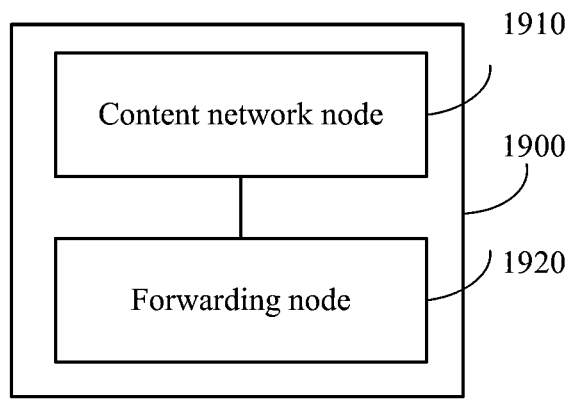
FIG. 19 is a schematic block diagram of a system for supporting content subscription in a content network according to another embodiment of the present invention.

FIG. 19 is a schematic block diagram of a system for supporting content subscription in a content network according to another embodiment of the present invention. A system 1900 includes a content network node 1910 and one or more forwarding nodes 1920. It should be noted that although FIG. 19 shows only one other forwarding node, in the embodiment of the present invention, there may be more other forwarding nodes.

The forwarding node 1920 may communicate with the content network node 1910 and a content providing device.

The content network node 1910 receives a first interest packet from UE, and forwards the first interest packet to the forwarding node 1920, where the first interest packet includes a first content identifier, and the first content identifier is used to indicate content to be subscribed to by the first interest packet.

When a PIT has a second subscription entry corresponding to the first content identifier obtained from the content network node 1910, the forwarding node 1920 adds a second port number used in receiving the first interest packet to the second subscription entry, so that a subscription request through a second port and corresponding to the first content identifier is valid within a first valid duration.

The forwarding node 1920 further receives multiple data packets corresponding to the content indicated by the first content identifier from the content providing device within the first valid duration.

The forwarding node 1920 forwards the multiple data packets to the content network node 1910.

The content network node 1910 forwards the multiple data packets to the UE after receiving the multiple data packets from the forwarding node 1920.

Reference may be made to the processes of the method embodiments in FIG. 5 to FIG. 11 for other functions and operations of the forwarding node 1920, which are not described herein to avoid repetition.

In the embodiment of the present invention, the forwarding node adds the second port number to the second subscription entry of the PIT, so that the subscription request through the second port represented by the second port number and corresponding to the first content identifier is valid within the first valid duration, and receives the multiple data packets corresponding to the content to be subscribed to from the content providing device within the first valid duration, so that the corresponding data packets can be returned to the content network node. Therefore, within the first valid duration, the content network node does not need to send the first interest packet repeatedly to subscribe to the same content, which can reduce the number of interest packets in the content network, reduce network signaling overhead, and improve forwarding efficiency (that is, multiple data packets can be received within a duration after one first interest packet is sent).

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to the corresponding process in the foregoing method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for subscribing content in a content network, wherein the content network comprises a content requesting node and a content providing node, the method comprising:
    receiving, by a processor of the content requesting node, a first interest packet through a first port from a first user device, wherein the first interest packet comprises a content identifier that indicates content to be subscribed by the first interest packet, the first interest packet indicating that a subscription request associated with the content identifier is valid within a first duration;
    creating, by the processor of the content requesting node, a subscription entry that comprises the content identifier and an identifier of the first port;

sending, by the processor of the content requesting node, the first interest packet to the content providing node;
receiving, by the processor of the content requesting node, a second interest packet through a second port from a second user device, wherein the second interest packet comprises the content identifier, that indicates content to be subscribed by the second interest packet, the second interest packet indicating that the subscription request associated with the content identifier is valid within a second duration;
adding, by the processor of the content requesting node, an identifier of the second port to the subscription entry;
replacing, by the processor of the content requesting node, the first duration of the subscription request associated with the content identifier in the subscription entry with the second duration;
receiving, by the processor of the content requesting node, multiple data packets provided by the content providing node according to the first interest packet, wherein the content comprises the multiple data packets; and
sending, by the processor of the content requesting node, the multiple data packets through the first port and the second port respectively to the first user device and second user device according to the subscription entry.

2. The method according to claim 1, further comprising maintaining, by the content requesting node, the identifier of the first port in the subscription entry within the first duration.

3. The method according to claim 2, further comprising when the first duration is expired, deleting, by the content requesting node, the identifier of the first port from the subscription entry.

4. The method according to claim 2, wherein the method further comprises:
when the content requesting node sends the multiple data packets through the first port to the first user device according to the subscription entry within the first duration, receiving, by the content requesting node, a third interest packet through the first port from the first user device, wherein the third interest packet comprises the content identifier, which indicates the first interest packet to be invalid; and
deleting, by the content requesting node, the identifier of the first port from the subscription entry according to the third interest packet.

5. The method according to claim 4, further comprising:
when the subscription has no identifier of any port, deleting, by the content requesting node, the subscription entry.

6. A content requesting node for subscribing content in a content network, wherein the content network comprises the content requesting node and a content providing node, the content requesting node comprising:
a memory configured to store instructions; and
a processor coupled to the memory and configured to execute the instructions to:
receive a first interest packet through a first port from a first user device, wherein the first interest packet comprises a content identifier that indicates content to be subscribed by the first interest packet, the first interest packet indicating that a subscription request associated with the content identifier is valid within a first duration;
create a subscription entry, wherein the subscription entry comprises the content identifier and an identifier of the first port;
send the first interest packet to the content providing node;
receive a second interest packet through a second port from a second user device, wherein the second interest packet comprises the content identifier that indicates content to be subscribed by the second interest packet, the second interest packet indicating that the subscription request associated with the content identifier is valid within a second duration;
add an identifier of the second port to the subscription entry;
replace the first duration of the subscription request associated with the content identifier in the subscription entry with the second duration;
receive multiple data packets provided by the content providing node according to the first interest packet; wherein the content comprises the multiple data packets; and
send the multiple data packets through the first port and the second port respectively to the first user device and the second device according to the subscription entry.

7. The node according to claim 6, the processor further configured to execute the instructions to:
maintain the identifier of the first port in the subscription entry within the first duration.

8. The node according to claim 7, wherein when the first duration is expired, the processor is further configured to execute the instructions to:
delete the identifier of the first port from the subscription entry.

9. The node according to claim 7, wherein when the content requesting node sends the multiple data packets through the first port to the first user device according to the subscription entry within the first duration, the processor is further configured to execute the instructions to:
receive a third interest packet through the first port from the first user device, wherein the third interest packet comprises the content identifier that indicates the first interest packet to be invalid; and
delete the identifier of the first port from the subscription entry according to the third interest packet.

10. The node according to claim 9, wherein when the subscription has no identifier of any port, the processor is further configured to execute the instructions to:
delete the subscription entry.

11. A method for subscribing content in a content network, wherein the content network comprises a content requesting node and a content providing node, the method comprising:
receiving, by a processor of the content requesting node, a first interest packet through a first port from a first user device, wherein the first interest packet comprises a content identifier that indicates content to be subscribed by the first interest packet;
creating, by the processor of the content requesting node, a subscription entry that comprises the content identifier and an identifier of the first port;
sending, by the processor of the content requesting node, the first interest packet to the content providing node;
receiving, by the processor of the content requesting node, a second interest packet through a second port from a second user device, wherein the second interest packet comprises the content identifier, that indicates content to be subscribed by the second interest packet;
adding, by the processor of the content requesting node, an identifier of the second port to the subscription entry;

receiving, by the processor of the content requesting node, multiple data packets provided by the content providing node according to the first interest packet, wherein the content comprises the multiple data packets;

sending, by the processor of the content requesting node, the multiple data packets through the first port and the second port respectively to the first user device and the second user device according to the subscription entry;

when the content requesting node sends the multiple data packets through the first port to the first user device according to the subscription entry within the first duration, receiving, by the content requesting node, a third interest packet through the first port from the first user device, wherein the third interest packet comprises the content identifier, which indicates the first interest packet to be invalid; and deleting, by the content requesting node, the identifier of the first port from the subscription entry according to the third interest packet.

\* \* \* \* \*